(12) United States Patent
Qin

(10) Patent No.: US 7,506,053 B1
(45) Date of Patent: Mar. 17, 2009

(54) SOFTWARE DISTRIBUTION SYSTEM AND METHOD

(75) Inventor: Johnson Jiahui Qin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 670 days.

(21) Appl. No.: 09/982,457

(22) Filed: Oct. 17, 2001

(51) Int. Cl.
*G06F 15/173* (2006.01)
*G06F 9/445* (2006.01)

(52) U.S. Cl. ...................... 709/225; 717/176

(58) Field of Classification Search ............... 709/203, 709/223, 225; 717/168–178; 726/2
See application file for complete search history.

(56) References Cited

U.S. PATENT DOCUMENTS

| | | | | |
|---|---|---|---|---|
| 5,835,911 A * | 11/1998 | Nakagawa et al. | ......... | 707/203 |
| 5,845,119 A * | 12/1998 | Kozuka et al. | ............. | 717/107 |
| 5,892,900 A * | 4/1999 | Ginter et al. | ................ | 713/200 |
| 6,219,652 B1 * | 4/2001 | Carter et al. | ................... | 705/59 |
| 6,314,409 B2 * | 11/2001 | Schneck et al. | ............... | 705/54 |
| 6,381,743 B1 * | 4/2002 | Mutschler, III | ............. | 717/104 |
| 6,408,311 B1 * | 6/2002 | Baisley et al. | ............... | 707/203 |
| 6,418,448 B1 * | 7/2002 | Sarkar | ..................... | 707/104.1 |
| 6,539,404 B1 * | 3/2003 | Ouchi | ......................... | 715/500 |
| 6,598,219 B1 * | 7/2003 | Lau | .............................. | 717/108 |
| 6,684,198 B1 * | 1/2004 | Shimizu et al. | .............. | 705/50 |
| 6,704,873 B1 * | 3/2004 | Underwood | ................ | 726/12 |
| 6,728,773 B1 * | 4/2004 | Corless | ....................... | 709/229 |
| 6,763,370 B1 * | 7/2004 | Schmeidler et al. | ......... | 709/203 |
| 6,785,685 B2 * | 8/2004 | Soetarman et al. | .......... | 707/101 |
| 6,789,194 B1 * | 9/2004 | Lapstun et al. | .............. | 713/176 |
| 6,820,063 B1 * | 11/2004 | England et al. | ............... | 705/54 |
| 6,820,204 B1 * | 11/2004 | Desai et al. | .................. | 713/201 |
| 6,824,051 B2 * | 11/2004 | Reddy et al. | ................. | 235/380 |
| 6,829,594 B1 * | 12/2004 | Kitamura | ...................... | 705/51 |
| 6,845,499 B2 * | 1/2005 | Srivastava et al. | ........... | 717/100 |
| 6,966,002 B1 * | 11/2005 | Torrubia-Saez | ............... | 726/29 |
| 7,069,293 B2 * | 6/2006 | Cox et al. | .................... | 709/203 |
| 7,103,598 B1 * | 9/2006 | Clement | ...................... | 707/10 |
| 7,325,193 B2 * | 1/2008 | Edd et al. | .................... | 707/102 |

OTHER PUBLICATIONS

Mann; O'Reilly Releases Pocket Ref to XML; Newsgroup: comp. unix.sco.announce; Nov. 1999.*
IBM Technical Disclosure Bulletin; Transformer Rules Strategy for Software Distribution Mechanism-Support Products; 1994.*
Lee et al.; XML-based Retrieval of Object-oriented Frameworks; 2000.*
Command Anti-virus Technical Support Webpage; Apr. 2000.*

\* cited by examiner

*Primary Examiner*—Ario Etienne
*Assistant Examiner*—Aaron Strange
(74) *Attorney, Agent, or Firm*—Stolowitz Ford Cowger LLP

(57) ABSTRACT

The present invention utilizes a comprehensive object oriented software architecture that is flexibly extendible to accommodate numerous features and activities associated software distribution including software development, management, marketing, selling and delivery. An automated software distribution method controls the distribution of software and automatically manages distribution information. A request to access a software distribution system is received. A determination is made if the requester has authorization as a user. If the user is authorized as an internal user, an internal process associated with a scaleable software distribution framework is performed. If the requester has authorization to engage in a commerce transaction process a scaleable software distribution system commerce transaction is executed. A commercial transaction process enables a user to download software.

24 Claims, 25 Drawing Sheets

| ATTRIBUTE NAME | DEFINITION (AND SAMPLE INPUT DATA) | NOT NULL? | DATA TYPE |
|---|---|---|---|
| XX_OBJECT_ID | Unique object identifier of software XX, for framework internal use. | Yes | VARCHAR2(50) |
| XX_NAME | Software XX name (e.g., if XX is version entry is 1.4, 2.3, 4.0, etc.; if XX is OS then entry is Unix, Win95, Win98, Linux, etc) | Yes | VARCHAR2(50) |
| HAS_PARENT_XX | Whether this XX has parent type or not (e.g., "Y" or "N"). | Yes | VARCHAR2(1) |
| PARENT_XX_ID | Unique object identifier of parent XX, for framework internal use. | Yes | VARCHAR2(50) |
| NUM_OF_CHILD_XX | Number of child XX belonging to this XX (e.g., default value is zero) | Yes | NUMBER |
| YY_OBJECT_ID | Unique object identifier of software YY containing this XX, for framework internal use. | Yes | VARCHAR2(50) |
| NUM_OF_YY | Number of software YY objects belonging to this XX (e.g., default value is zero) | Yes | NUMBER |
| CREATE_BY | Person creating this software XX (e.g., jqin) | Yes | VARCHAR2(30) |
| CREATE_DATE | Date when this software XX is created (e.g., 14-DEC-2000) | Yes | DATE |
| MODIFY_BY | Person modifying this software XX(e.g., jqin) | No | VARCHAR2(30) |
| MODIFY_DATE | Date when this software XX is modified (e.g., 14-DEC-2000) | NO | DATE |
| PRIMARY KEY | XX_OBJECT_ID | | |
| FOREIGN KEY | YY_OBJECT_ID references SWDF_SW_YY(YY_OBJECT_ID) | | |

| ATTRIBUTE NAME | DEFINITION & SAMPLE INPUT DATA | NOT NULL ? | DATA TYPE |
|---|---|---|---|
| OS_OBJECT_ID | Unique object identifier of software operating system for framework internal use only. | YES | VARCHAR2(50) |
| OS_NAME | Software operating system name (i.e. Unix, Win95, Win98, Win2000, Window NT, Linux etc). | YES | VARCHAR2(50) |
| HAS_PARENT_OS | Whether this OS object has parent operating system or not (i.e. "Y" or "N"). | YES | VARCHAR2(1) |
| PARENT_OS_ID | Unique object identifier for the parent OS of this OS object for framework internal use only. | YES | VARCHAR2(50) |
| NUM_OF_CHILD_OS_OBJECTS | Number of child OS objects of this software OS object (i.e. default value is zero). | YES | NUMBER |
| SW_OBJECT_ID | Unique object identifier for the software object containing this software OS object for framework internal use only. | YES | VARCHAR2(50) |
| NUM_OF_VERSION_OBJECTS | Number of software version objects belonging to this software OS object (i.e. default value is zero). | YES | NUMBER |
| CREATE_BY | Person creating this software OS object (i.e. jqin, tblum). | YES | VARCHAR2(30) |
| CREATE_DATE | Date when this software OS object is created (i.e. 14-DEC-2000). | YES | DATE |
| MODIFY_BY | Person modifying this software OS object (i.e. jqin, mmichell). | NO | VARCHAR2(30) |
| MODIFY_DATE | Date when this software OS object is created (i.e. 14-DEC-2000). | NO | DATE |
| PRIMARY KEY | OS_OBJECT_ID | | |
| FOREIGN KEY | SW_OBJECT_ID References SWDF_SW_Object (SW_OBJECT_ID) | | |

FIG 13B

| ATTRIBUTE NAME | DEFINITION & SAMPLE INPUT DATA | NOT NULL ? | DATA TYPE |
|---|---|---|---|
| VERSION_OBJECT_ID | Unique object identifier of software version for framework internal use only. | YES | VARCHAR2(50) |
| VERSION_NUMBER | Software version number (i.e. 10.0, 11.3, 9.21). | YES | VARCHAR2(50) |
| HAS_PARENT_VERSION | Whether this version has parent version or not (i.e. "Y" or "N"). | YES | VARCHAR2(1) |
| PARENT_VERSION_ID | Unique object identifier for the parent version of this version for framework internal use only. | YES | VARCHAR2(50) |
| NUM_OF_CHILD_VERSIONS | Number of child version objects of this software version object (i.e. default value is zero). | YES | NUMBER |
| OS_OBJECT_ID | Unique object identifier for the software OS object containing this software version object for framework internal use only. | YES | VARCHAR2(50) |
| NUM_OF_ENTITY_OBJECTS | Number of software entity objects belonging to this software version object (i.e. default value is zero). | YES | NUMBER |
| CREATE_BY | Person creating this software version (i.e. jqin, tchen). | YES | VARCHAR2(30) |
| CREATE_DATE | Date when this software version is created (i.e. 14-DEC-2000). | YES | DATE |
| MODIFY_BY | Person modifying this software version (i.e. jqin, twany). | NO | VARCHAR2(30) |
| MODIFY_DATE | Date when this software version is created (i.e. 16-DEC-2000). | NO | DATE |
| PRIMARY KEY | VERSION_OBJECT_ID | | |
| FOREIGN KEY | OS_OBJECT_ID References SWDF_SW_OS (OS_OBJECT_ID) | | |

FIG 13C

| ATTRIBUTE NAME | DEFINITION & SAMPLE INPUT DATA | NOT NULL ? | DATA TYPE |
|---|---|---|---|
| ENTITY_OBJECT_ID | Unique object identifier of software entity for framework internal use only. | YES | VARCHAR2(50) |
| ENTITY_NAME | Software entity name (i.e. igs-bpx-1.100-12.bin, igs-d-1.100-12.bin). | YES | VARCHAR2(30) |
| ENTITY_SIZE | Software entity size (i.e. 3638 KB, 2935KB). | YES | VARCHAR2(30) |
| ENTITY_DESC | Software entity description (i.e. CISCO IOS Software). | YES | VARCHAR2(200) |
| ENTITY_STATUS | Software entity status (i.e. ED, LD, GD). | YES | VARCHAR2(30) |
| ENTITY_CHECKSUM_TYPE | Software entity checksum type (i.e. MD5, BSD). | NO | VARCHAR(30) |
| ENTITY_CHECKSUM | Software entity checksum value (i.e. d41d8cd98f00b204e9800998ecf8427e). | NO | VARCHAR2(50) |
| ENTITY_DIGITAL_CERTIFICATE | Software entity digital certificate (i.e. N/A) | NO | VARCHAR2(100) |
| PUBLISHED_BY | Person publishing this software entity (i.e. jqin, sherman). | YES | VARCHAR2(30) |
| PUBLISHED_DATE | Date when this software entity is published (i.e. 14-DEC-2000) | YES | DATE |
| ENTITY_URL | Software entity URL (i.e. ftp://ftp.cisco.com/cisco/ios/10.0/10.0.12/2500/ ). | YES | VARCHAR2(200) |
| ENTITY_HOST_NAME | Software entity host name (i.e. ftp.cisco.com). | YES | VARCHAR2(50) |
| HAS_PARENT_ENTITY | Whether this entity has parent location or not (i.e "Y" or "N"). | YES | VARCHAR2(1) |
| PARENT_ENTITY_ID | Unique object identifier for the parent entity of this entity for framework internal use only. | YES | VARCHAR2(50) |
| NUM_OF_CHILD_ENTITIES | Number of child entity objects of this software entity object (i.e. default value is zero). | YES | NUMBER |
| VERSION_OBJECT_ID | Unique object identifier for the software version object containing this software entity object for framework internal use only. | YES | VARCHAR2(50) |
| CREATE_BY | Person creating this software entity (i.e. jdole, tblum). | YES | VARCHAR2(30) |
| CREATE_DATE | Date when this software entity is created (i.e. 14-DEC-2000). | YES | DATE |
| MODIFY_BY | Person modifying this software entity (i.e. jqin, sherman) | NO | VARCHAR2(30) |
| MODIFY_DATE | Date when this software entity is created (i.e. 14-DEC-2000). | NO | DATE |
| ENTITY_INSTRUCTIONS | Software entity installation instructions. | NO | VARCHAR2(2000) |
| PRIMARY KEY | ENTITY_OBJECT_ID | | |
| FOREIGN KEY | VERSION_OBJECT_ID References SWDF_SW_VERSION (VERSION_OBJECT_ID) | | |

FIG 13D

| ATTRIBUTE NAME | DEFINITION (AND SAMPLE INPUT DATA) | NOT NULL? | DATA TYPE |
|---|---|---|---|
| AA_OBJECT_ID | Unique object identifier of software XX, for framework internal use. | Yes | VARCHAR2(50) |
| BB_OBJECT_ID | Software XX name (e.g., if XX is version entry is 1.4, 2.3, 4.0, etc.; if XX is OS then entry is Unix, Win95, Win98, Linux, etc) | Yes | VARCHAR2(50) |
| CREATE_BY | Person creating this link (e.g., jqin) | Yes | VARCHAR2(30) |
| CREATE_DATE | Date when this link is created (e.g., 14-DEC-2000) | Yes | DATE |
| PRIMARY KEY | AA_OBJECT_ID and BB_OBJECT_ID | | |
| FOREIGN KEY | AA_OBJECT_ID references SWDF_SW_AA(AA_OBJECT_ID) BB_OBJECT_ID references SWDF_SW_BB(BB_OBJECT_ID) | | |

| ATTRIBUTE NAME | DEFINITION & SAMPLE INPUT DATA | NOT NULL? | DATA TYPE |
|---|---|---|---|
| PROG_OBJECT_ID | Unique object identifier of software program for framework internal use only. | YES | VARCHAR2(50) |
| TYPE_OBJECT_ID | Unique object identifier of software type for framework internal use only. | YES | VARCHAR2(50) |
| CREATE_BY | Person creating this link (i.e. jqin, jdole). | YES | VARCHAR2(30) |
| CREATE_DATE | Date when this software link is created (i.e. 14-DEC-2000). | YES | DATE |
| PRIMARY KEY | PROG_OBJECT_ID and TYPE_OBJECT_ID | | |
| FOREIGN KEY | PROG_OBJECT_ID References SWDF_SW_PROGRAM (PROG_OBJECT_ID)<br><br>TYPE_OBJECT_ID References SWDF_SW_TYPE (TYPE_OBJECT_ID) | | |

FIG 14B

| ATTRIBUTE NAME | DEFINITION & SAMPLE INPUT DATA | NOT NULL ? | DATA TYPE |
|---|---|---|---|
| USER_OBJECT_ID | Unique object identifier of software user for framework internal use only. | YES | VARCHAR2(50) |
| ROLE_OBJECT_ID | Unique object identifier of software role for framework internal use only. | YES | VARCHAR2(50) |
| CREATE_BY | Person creating this link (i.e. jqin, jdole). | YES | VARCHAR2(30) |
| CREATE_DATE | Date when this software link is created (i.e. 14-DEC-2000). | YES | DATE |
| PRIMARY KEY | USER_OBJECT_ID and ROLE_OBJECT_ID | | |
| FOREIGN KEY | USER_OBJECT_ID References SWDF_SW_USER (USER_OBJECT_ID)<br><br>ROLE_OBJECT_ID References SWDF_SW_ROLE (ROLE_OBJECT_ID) | | |

Fig 14C

SOFTWARE DISTRIBUTION SYSTEM AND METHOD

FIELD OF THE INVENTION

This invention relates to the field of software distribution. In particular, the present invention relates to an automated scaleable electronic commerce software distribution system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Systems providing these advantageous results often include processors that operate by executing software programs comprising a series of instructions. Typically the software applications are distributed to numerous entities. However, traditional attempts at efficiently managing the distribution of a wide variety of software applications to numerous entities consumes significant resources.

Software programs typically include instructions that direct the functions of a processor device in the performance of useful tasks. The utility of a software program often depends upon how advanced and recent the application is. Advanced software applications directed to performing complex functions are being developed at exponentially increasing rates. Efficient and convenient distribution of new software application versions is very important for enabling customers to experience the benefits of the latest applications.

Managing the distribution of software programs is a very complicated and tedious endeavor. There are a lot of different activities that have an impact on the distribution of a software program. Development activities play a critical role in the distribution of a software program and the distribution of a software program initially depends on development of a software image such as the binary code instructions. Development activities continue to impact distribution as development of new software programs requires careful control measures to ensure the development proceeds in a proper and orderly manner. As software programs become more complex and modular the need for sophisticated tracking and control measures of differing software versions becomes critical. Commercial activities also typically have a significant impact on software distribution. Software products are usually sold and software distribution is typically associated with commercial activities. There are wide variety of commercial activities that impact software distribution, such as marketing, selling, purchasing contracts, licensing, etc. Coordinating and managing the impacts of these activities on software distribution traditionally requires a lot of resources.

The vast amount of activities that potentially impact distribution of software commodities make management of software distribution very difficult. Prior attempts at software distribution typically lack desirable scaleability, integration and automation features. Traditional software distribution platforms typically utilize low-level, command-line and Perl-based scripts that require significant manual support such as significant daily operation workload support to handle low-level file system directories, file system permissions for the software distribution, etc. In the past, vast information from various activities that impact software distribution is not typically integrated in a structured and coordinated manner. For example, the information that impacts software distribution such as software version, software user entitlement and user personalized requirements is not integrated across different software information resources in traditional software distribution approaches making desirable distribution management features very difficult to realize.

What is required is a system and method that facilitates streamlined software distribution management including automated integration of software distribution information.

SUMMARY

The present invention is a software distribution system and method that facilitates efficient and effective management of software distribution information. A present invention software distribution system and method permits a flexible combination of various types of information associated with the automated distribution of software. The present invention utilizes a comprehensive object-oriented software distribution framework (SWDF) architecture which is flexibly extensible and scaleable to accommodate numerous features and activities associated software distribution. In one embodiment of the present invention, the distribution activities are associated with software development, management, marketing, selling and delivery.

In one embodiment of the present invention, an automated software distribution method facilitates control and management of software distribution activities and information. A request to access a SWDF system is received. A determination is made if the requester is a registered user. If the requester is a registered user a determination is made if the user is authorized to perform an SWDF internal activity or a SWDF commerce activity. If the user is authorized as an internal user, an internal process associated with the SWDF is performed. If the requester is authorized to engage in a commerce transaction process a scaleable SWDF commerce activity is performed.

A computer usable medium having a computer readable program code embodied therein for causing a computer system to perform an automated software distribution method comprising: receiving a request to access a software distribution system, determining if the requester is a registered user, determining if a user has authorization to perform internal or commercial scaleable software distribution framework activity, performing an internal process associated with a scaleable software distribution framework if authorized, and performing a scaleable software distribution system commerce transaction if authorized. The request can be received from an external user via the Internet. The user can be able to access an internal storage of software products. The internal user can be able to download software code, make changes and upload the modified code, and both internal and external users can be able to engage in a scaleable software distribution system commerce transaction.

DESCRIPTION OF THE DRAWINGS

FIG. 13A is an illustration of a generic SWDF object table arrangement utilized in one embodiment of the present invention.

FIG. 13B shows an exemplary SWDF object table for an operating system.

FIG. 13C illustrates an exemplary SWDF object table for version object.

FIG. 13D depicts an exemplary SWDF object table for an entity object.

FIG. 14A is an illustration of generic SWDF link database table included in one embodiment of the present invention.

FIG. 14B shows an exemplary SWDF link database tables for an program/type link.

FIG. 14 C shows an exemplary SWDF link database tables for a user/role link.

DETAILED DESCRIPTION

Reference will now be made in detail to the preferred embodiments of the invention, a software distribution framework system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a software distribution system and method that facilitates efficient and effective distribution of software. A present invention software distribution system and method permits a flexible combination of a number of different characteristics and information associated with the automated distribution of software. In one exemplary implementation of the present invention, an XML-based software distribution framework is utilized. For example, a present invention software distribution system and method enables automatic distribution of software over the Internet and World Wide Web (WWW) while coordinating, correlating and collecting information that assists software distribution management and maintenance activities. Utilizing the Internet and World Wide Web as a central technology platform, the software distribution framework (SWDF) is a middleware system for publishing software images based on a business rule/responsibility model and distributing software products to customers based on customer personalized need, software right and software entitlement, etc.

Figure 1:
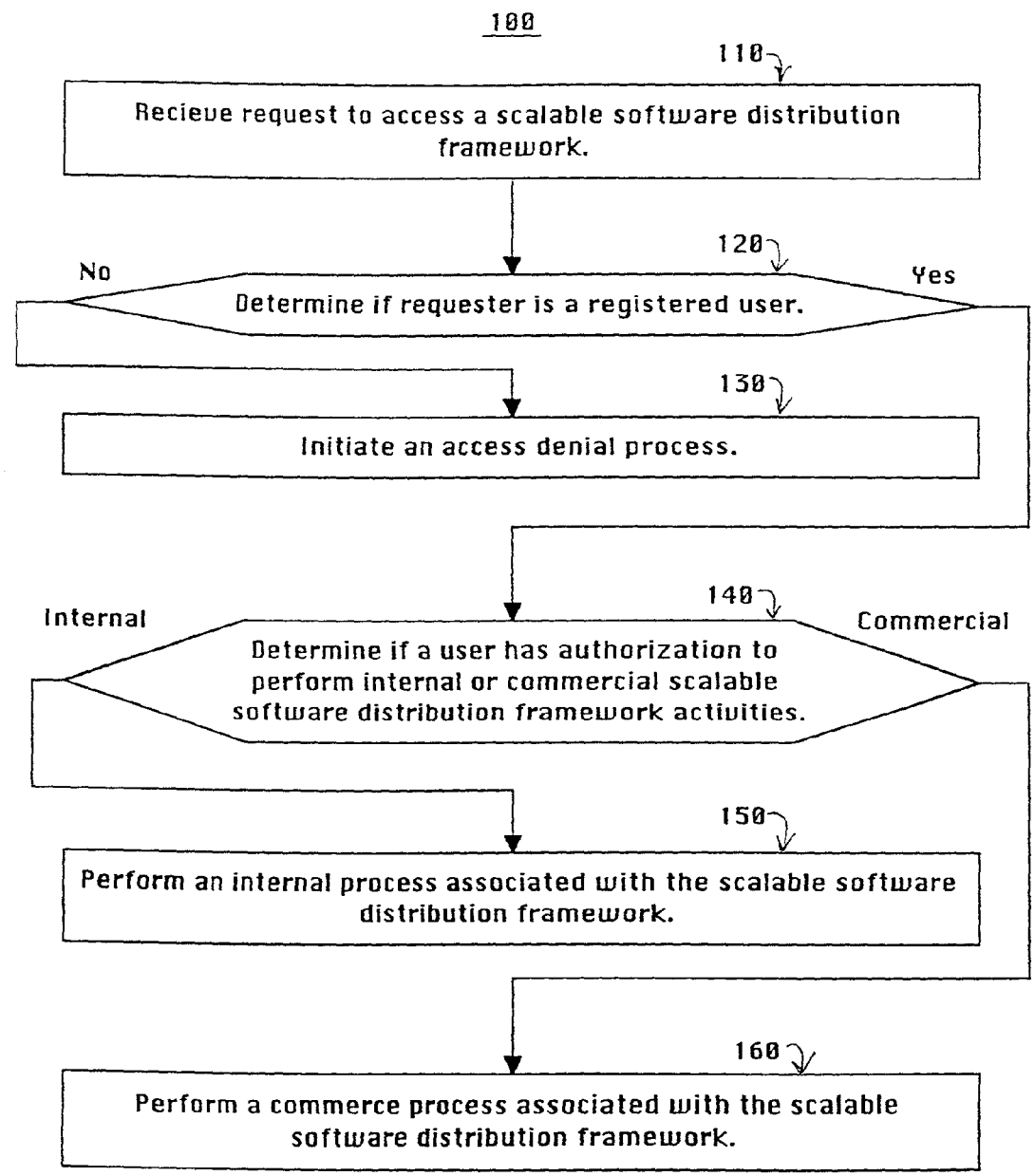
FIG. 1 is a flow chart of an automated software distribution method included in one embodiment of the present invention.

FIG. 1 is a flow chart of automated software distribution method 100, one embodiment of the present invention. Automated software distribution method 100 facilitates management and automated distribution of software programs. In one embodiment of the present invention, automated software distribution method 100 is part of a scaleable and cost-effective SWDF implemented on a revenue-generating platform and middleware system for seamlessly streamlining, integrating and automating both internal software distribution (a.k.a. software publish process) and an external commerce process.

In step 110, a request is received to access a software distribution system. In one embodiment of the present invention, the request is received via a communication network. In one exemplary implementation of the present invention the request is received from an internal user via an intranet network or local area network (LAN). In another exemplary implementation of the present invention, the request is received from an external user via the Internet. It is appreciated that the present invention is readily adaptable to receiving requests from a variety of communication network configurations.

In step 120, a determination is made if the requester is a registered user. In one embodiment of the present invention, information entered by a requester in a SWDF architecture interface (e.g., a user object) is compared to information associated with a user profile and if there is a match the requester is considered a registered user. If the requester is a register user the process skips to step 140. If the requester is not a registered user the process proceeds to step 130.

In step 130, an access denial process is initiated. In one embodiment of the access denial process provides the requester an opportunity to provide information and request to be registered. If the requester is not granted registration status the requester is denied access.

In step 140, a determination is made if user has authorization to perform internal or commerce scaleable software distribution framework activities. In one embodiment of the present invention, users are authorized access to an internal software program object (e.g., SW_Program) based upon their role and have authorization to particular tools that facilitate the performance of various internal scaleable software distribution framework activities. In one embodiment of the present invention, the internal authorized user is able to perform internal software publishing such as software image transfer from host to host and from directory to directory in the same host. If the requester is not granted access as an internal user the process skips to step 160. If the requester does have authorization to access the system as an internal user the process proceeds to step 150.

In step 150, an internal process associated with the scaleable software distribution framework is performed. In one embodiment of the present invention, the user is able to access an internal software program object (e.g., SW_Program). The internal software program object (e.g., SW_Program)

includes links to a variety of SWDF manager objects that permit a user to manipulate corresponding SWDF information objects. In one exemplary implementation of the present invention the SWDF manager and information objets are associated with user information, authorization information, software description information, software commerce information, software distribution information and software product configuration information. The user is able to download software code from an internal storage system, make changes to the software code and upload the modified code to the internal storage system.

In step 160, a scaleable software distribution system commerce transaction is executed. In one embodiment of the present invention a scaleable software distribution system commerce transaction is engaged in an electronic commerce environment. In one embodiment of the present invention a software transaction process is utilized.

Figure 2:
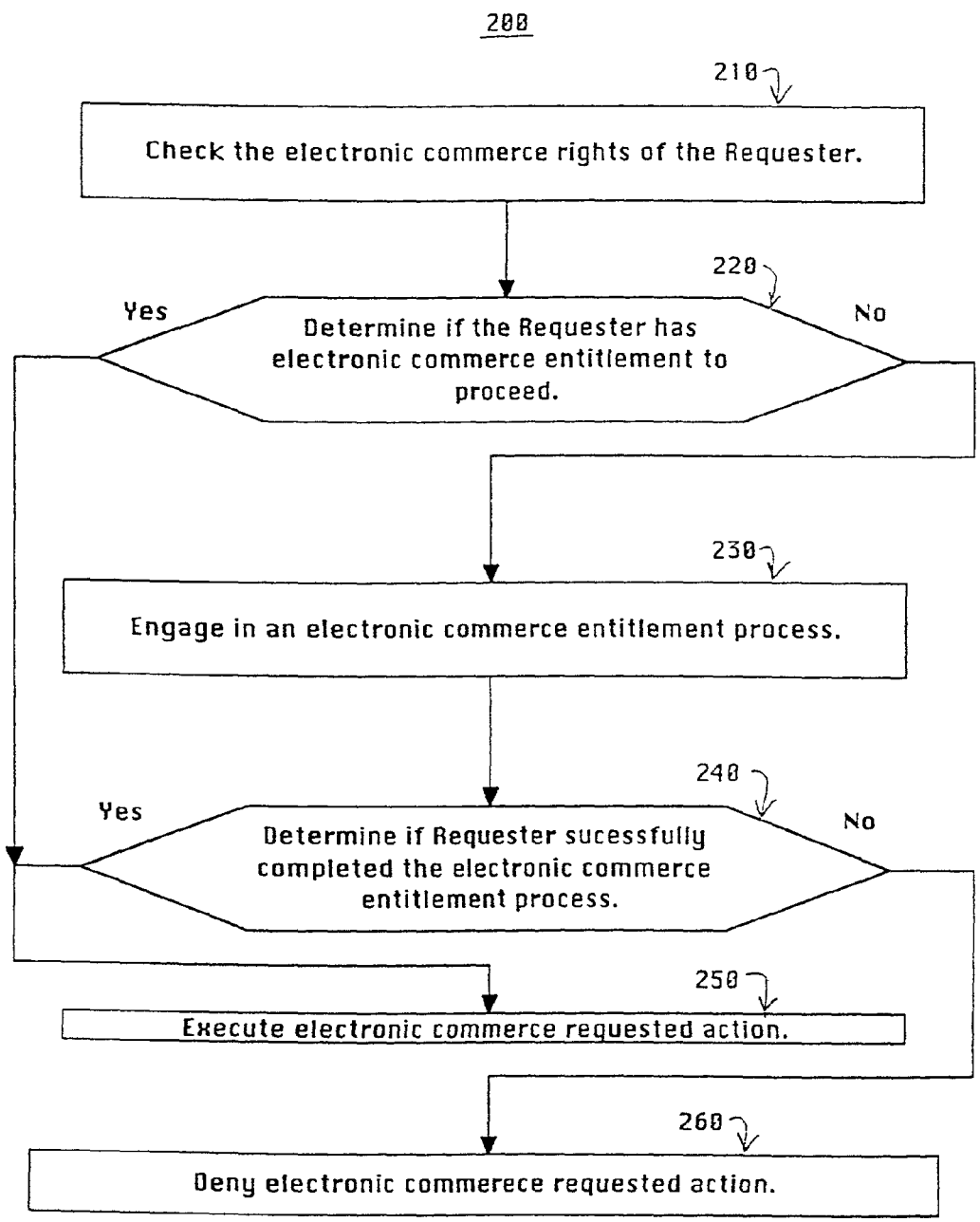
FIG. 2 is a flow chart of commercial transaction process included in one embodiment of a present invention commercial transaction process.

FIG. 2 is a flow chart of commercial transaction process 200, one embodiment of a present invention commercial transaction process. In one exemplary implementation of the present invention the commercial transaction process is an electronic commerce process. For example, the commercial transaction process is an interactive process between an external customer and the SWDF system over the Internet.

In step 210, the commercial transaction rights of the requester are examined. In one embodiment of the present invention, the SWDF system stores information on the commercial transaction rights of both external and internal customers. The SWDF Right Information indicates software permissions or access-control rights of a customer to download different software categories like public software for free, basic access software (e.g., employee/regular customer/reseller/partner etc.), special access software's for certain software customers, and crypto software for some customers with high privileges.

In step 220, a determination is made if the requester has entitlement to proceed with a commercial transaction. In one embodiment of the present invention, the SWDF system stores information on the entitlements of both internal and external customers to engage in commercial transactions. In one exemplary implementation of the present invention, the SWDF Entitlement Information includes information on whether the customer has a service contract or paid money for the requested software product. If the customer has entitlement to proceed the requested software product is allowed to be downloaded.

In step 230, a commercial transaction entitlement process is engaged. The transaction entitlement process is utilized to establish entitlement to receive a copy of the image of a software program. In one exemplary implementation of the present invention, the entitlement process includes establishing that the requester has arranged to provide financial consideration in exchange for a software image copy. In one embodiment of the present invention, a commercial transaction entitlement process includes establishing a service contract or paying money for the requested software product. In one exemplary implementation the commercial transaction entitlement process is taken care of by a SWDF Purchase Model.

In step 240, an investigation is made to determine if a requester has successfully completed a commercial transaction entitlement process. If the requester does not successfully complete the commercial transaction entitlement process the process jumps to step 260. If the Requester successfully completed the commercial transaction entitlement process the process proceeds to step 250.

In step 250, the requested commercial transaction is executed. In one embodiment of the present invention the requested commercial transaction includes downloading a software product. In one exemplary implementation, the software product comprises software image binary executables, readme information, installation instructions, product manuals, guide and software requirements, and software release note, and software licensing key, etc.

In step 260 the requested commercial transaction is denied.

Figure 3:
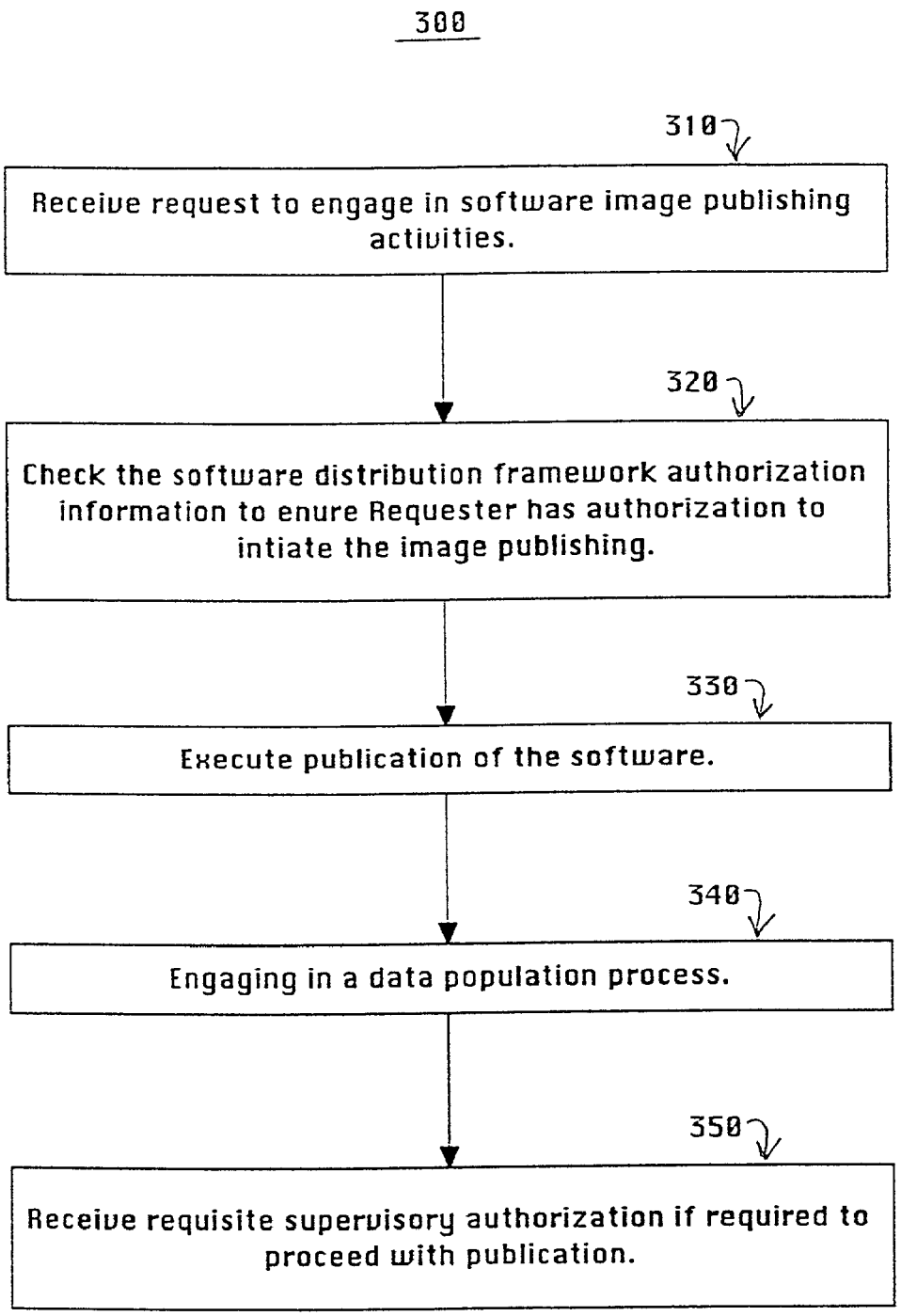
FIG. 3 is a flow chart of an internal software publishing process utilized in one embodiment of the present invention.

FIG. 3 is a flow chart of internal software publishing process 300, one embodiment of a publishing process utilized in the present invention. In one embodiment of the present invention, the publication process includes placing a software image in a storage system that is accessible by authorized requesters. Software publishing process 300 uses the present invention SWDF publication tools to distribute the software image. In one exemplary implementation of the present invention, the information is published on a software web host server for final software product release. In one embodiment of the present invention the publication process completes a server-to-server process (i.e. from software image repository to software product web host) and a directory-to-directory process on a web host server (e.g., following an organization's standard product hierarchy, structure, etc.).

In step 310, a request to engage in software image publishing activities is received. In one embodiment of the present invention, the request is received from a software engineer that has built a software image ready for commercial release. Software companies typically have a software build group responsible for building and appropriately distributing the software image into a software image repository.

In step 320, the software distribution information (e.g., work authorization information) is checked to ensure the requester has authorization to engage in software image publication activities. In one exemplary implementation, SWDF authorization information is checked to make sure that the requester has appropriate role responsibility to engage in image publishing for certain authorized software types.

In step 330, the software publication is executed. In one exemplary implementation of the present invention, a software publishing command is issued to actually publish the particular image on web host web ready for commercial transactions (e.g., E-Commerce). In one embodiment of the present invention a publish model handles the software image publishing execution.

In step 340, a data population process is engaged for software publishing. In one embodiment of the present invention, the data population process includes a SWDF Information Model, SWDF Product Model and SWDF Packaging Model. In one exemplary implementation, the data population of SWDF Information includes populating data of software information by SWDF publishing tool. In one exemplary implementation of the present invention, the data population of the SWDF product model is done by following an organization's standard product release structure. The data population of SWDF packaging model is completed by pulling data from a database comprising the mapping of information between a software image to a software product code.

In step 350, requisite supervisory authorization to proceed with the publication is received. In one exemplary implementation, a product manager or software release team performs a final accuracy check of information associated with a software product, such as software release notes, a software image binary name, readme, installation instructions, software product information, software documentation, etc. If everything is OK for the software product releases, a flag field (e.g., "RELEASE_FLAG") is changed to indicate that publication may proceed (e.g., from "No" to "YES"). At the is point the software image is ready for commercial transactions (e.g., E-Commerce process).

Figure 4A:
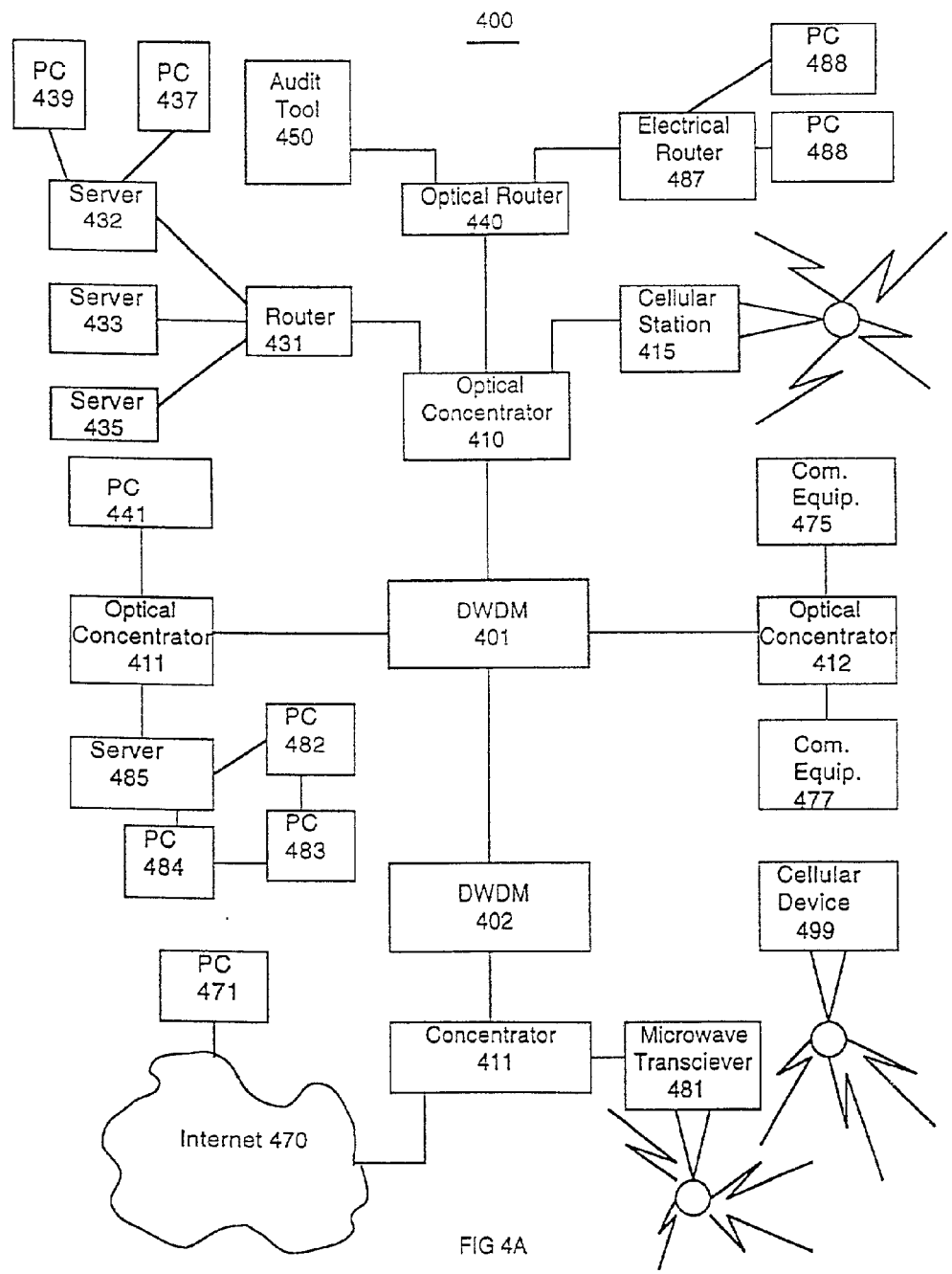
FIG. 4A is block diagram of a communications network utilized to implement one embodiment of the present invention.

In one embodiment, the present invention software distribution methods are implemented on servers connected via a communication network. FIG. 4A is a block diagram of communication network 400. In one embodiment of the present invention, automated software distribution method 100 is implemented via communications network 400. Communication network 400 comprises automated software distribution system 450, dense wave division multiplexer (DWDM) 401 and 402, optical concentrators 410, 411, 421 and 417, routers 431, 440 and 487, cellular station 415, cellular device (e.g., phone, handheld computer, etc.) 499, microwave transceiver 481, Internet 470, servers 485, 432, and 433, personal computers 435, 437, 439, 441, 471, 482, 483, 484, 488 and 489, and miscellaneous communication equipment 475 and 477. The components of communications network 400 communicate with each other over a variety of architectures utilizing numerous communication protocols. One exemplary implementation of communications network 400 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Figure 4B:
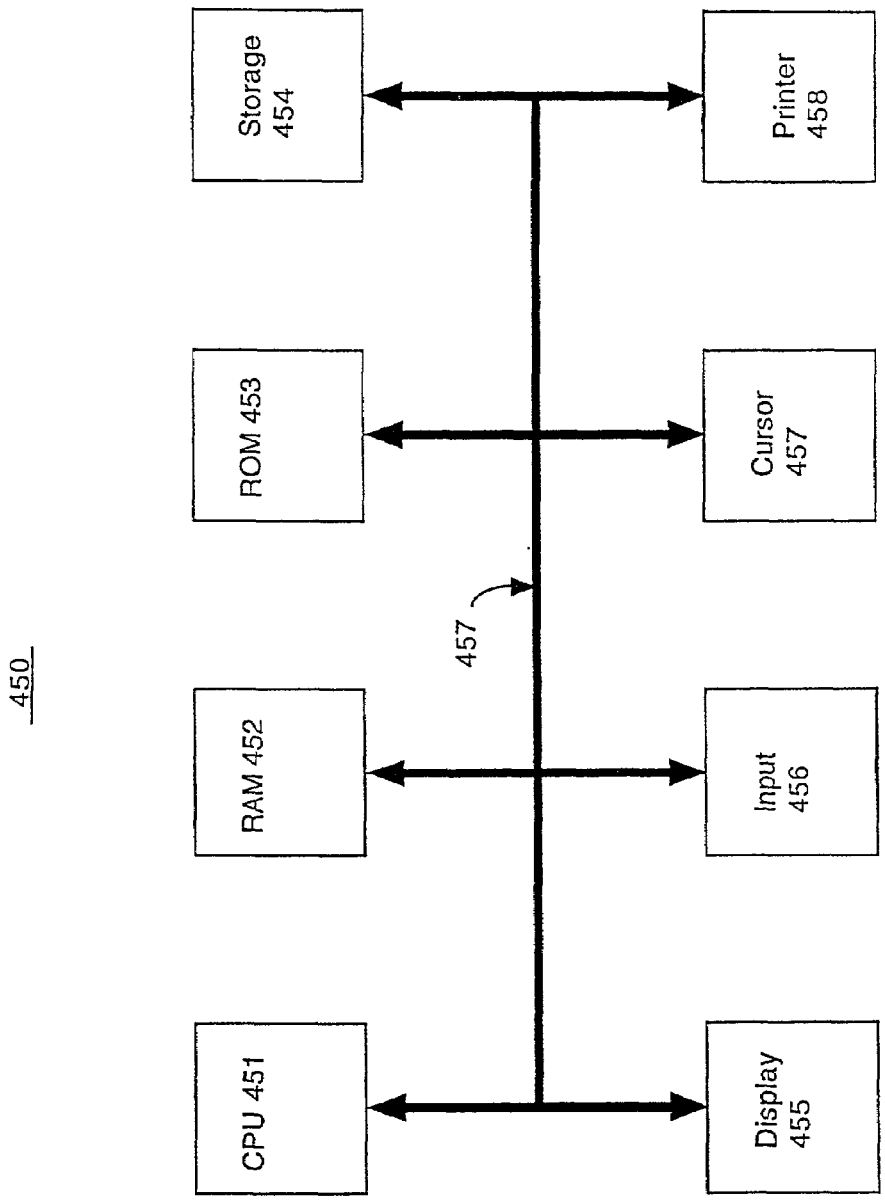
FIG. 4B is a block diagram of an exemplary automated software distribution system of the present invention.

FIG. 4B is a block diagram of automated software distribution system 450, one embodiment of the present invention. In general, automated software distribution system 450 comprises a bus 457, a central processor 451, a random access memory 452, a read only memory 453, a data storage device 454, a display device 455, an alphanumeric input device 456, a cursor control device 457 and a printer 458. Bus 457 is coupled to central processor 451, random access memory 452, read only memory 453, data storage device 454, display device 455, alphanumeric input device 456, cursor control device 457 and printer 458.

The components of automated software distribution system 450 cooperatively operate to perform their designated functions. Central processor 451 processes information and instructions including instructions associated with automated software distribution method 100. Random access memory 452 stores information and instructions for the central processor 451 including information and instructions associated with automated software distribution method 100. Read only memory 453 stores static information and instructions for the processor 451. Data storage device 404 stores information and instructions (e.g., such as a magnetic or optical disk and disk drive). Display device 455 displays information to a computer user. Alphanumeric input device 456 includes alphanumeric and function keys for communicating information and command selections to the central processor 451. Cursor control device 457 communicates user input information and command selections to the central processor 451. Printer 458 prints documents in accordance with directions from central processor 451. Bus 457 is a path for communicating information.

The components of automated distribution network system 450 comprise a variety of interchangeable embodiments. For example, the display device 455 of FIG. 4B may be a liquid crystal device, cathode ray tube, or other display device suitable for creating graphic images and alphanumeric characters recognizable to the user. It is also to be appreciated that there are many implementations of cursor control device 457, including a trackball, mouse, joystick or a number of other specially adapted cursor directing devices for providing input to direct and/or activate the cursor. In one embodiment of automated software distribution server 450, keys on alphanumeric input device 455 are also capable of signaling movement of a given direction or manner of displacement. For example, the cursor may be directed and/or activated via input from the keyboard of alphanumeric input device 455 using special keys and key sequence commands. Cursor control device 457 of automated software distribution server 450 allows a computer user to dynamically signal the two dimensional movement of a cursor or visible symbol (pointer) on a display screen of the display device 455. Alternatively alphanumeric input device 455 allows the user to create graphic images and alphanumeric characters on a display screen of the display device 455. Automated distribution system 450 is a platform that performs automated software distribution method 100.

Figure 5A:
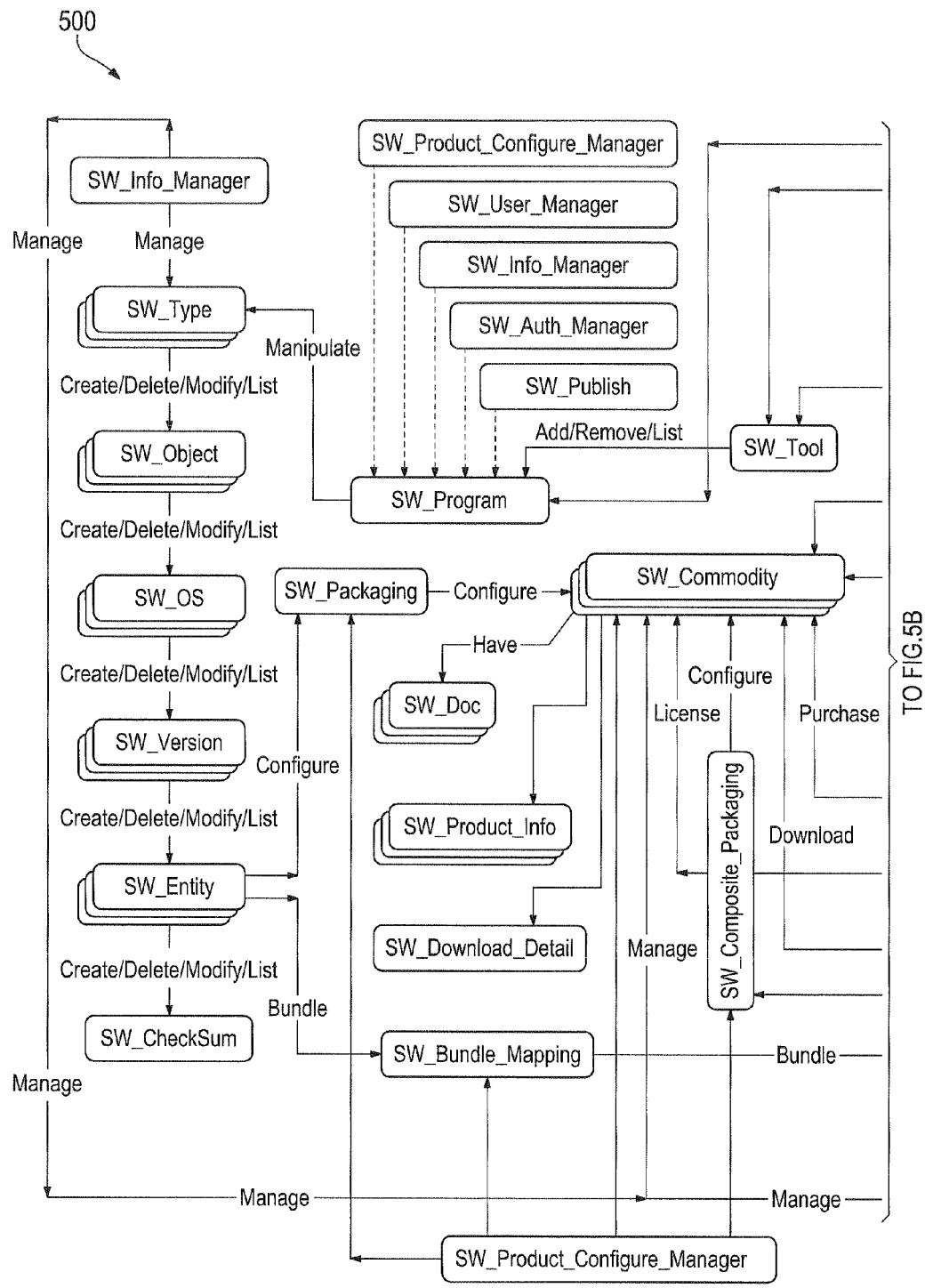
FIGS. 5A-5B are block diagrams of an object oriented software distribution framework (SWDF) architecture, one embodiment of the present invention.
Figure 5B:
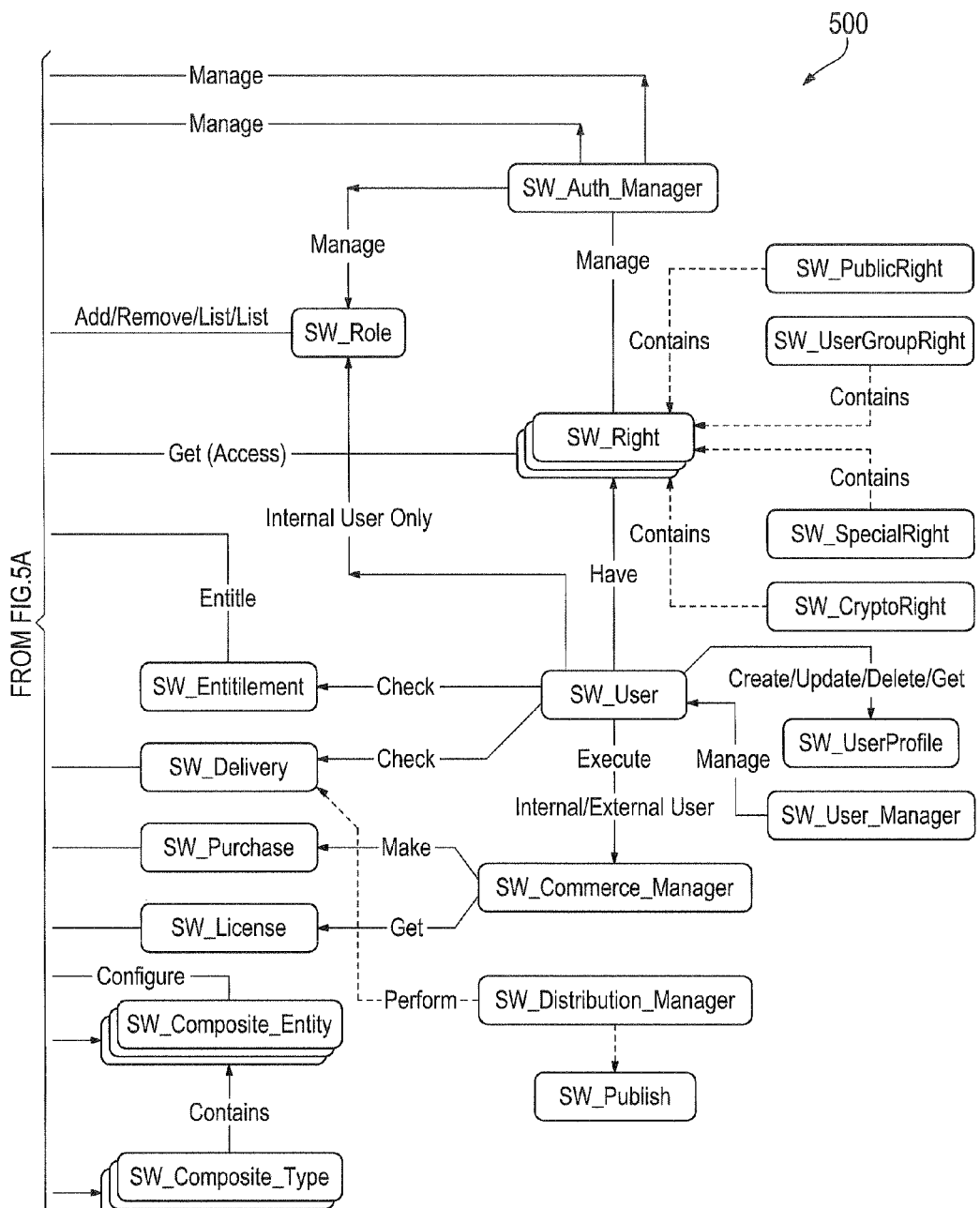
Figure 6A:
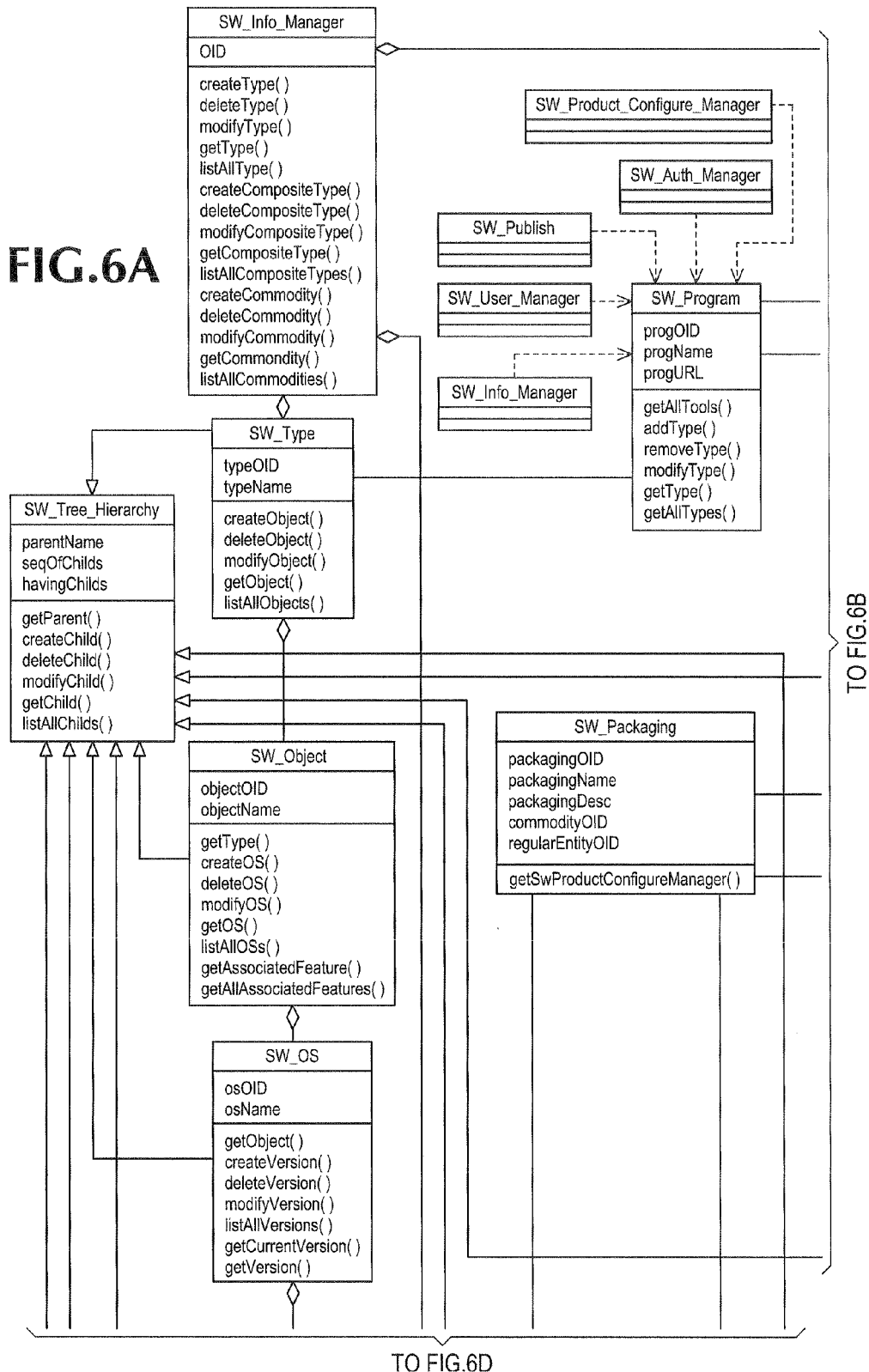
FIGS. 6A-6F are block diagrams of UML object model including designations for classes, attributes and operations included in one embodiment of the present invention.
Figure 6B:
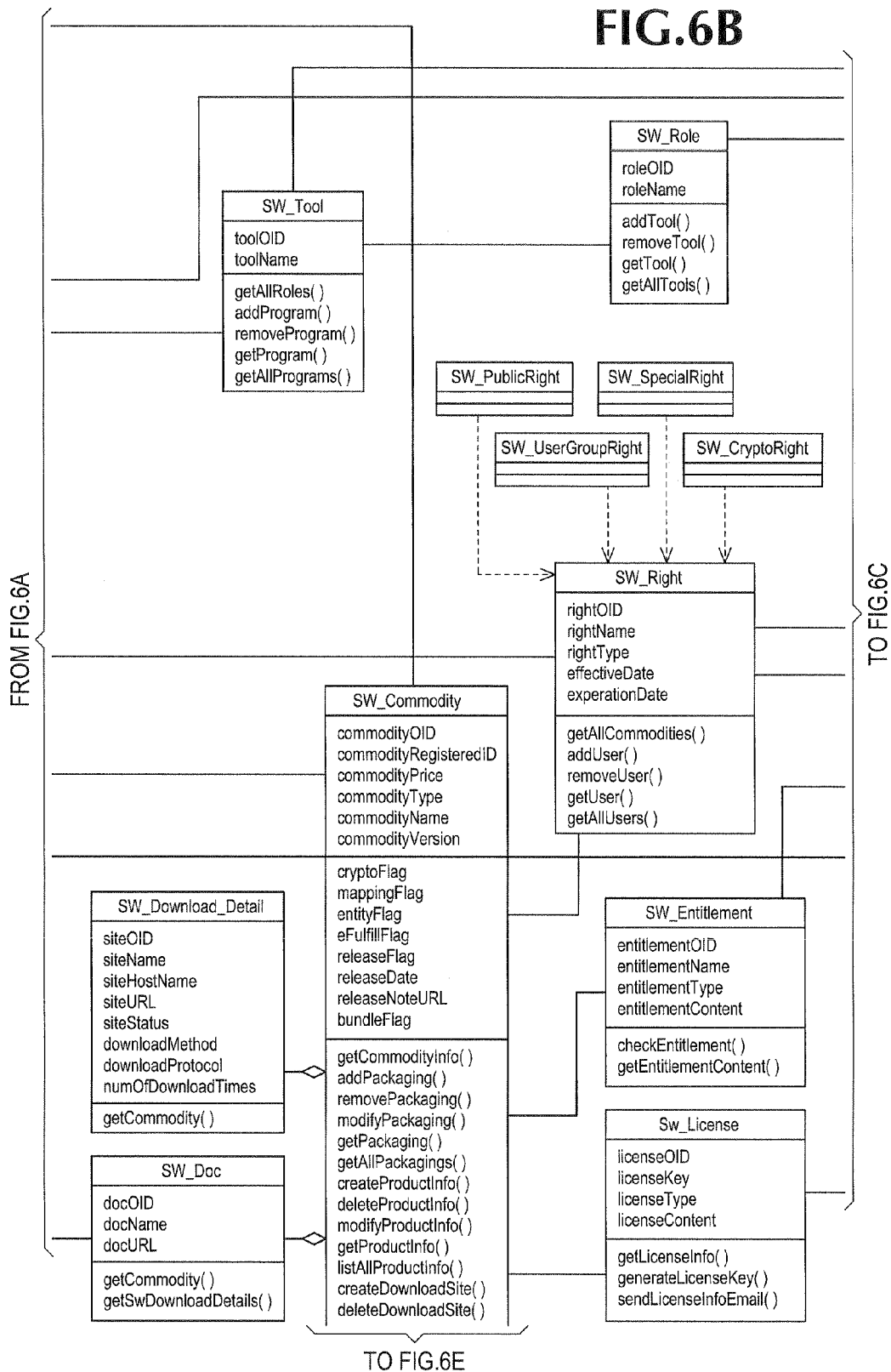
Figure 6C:
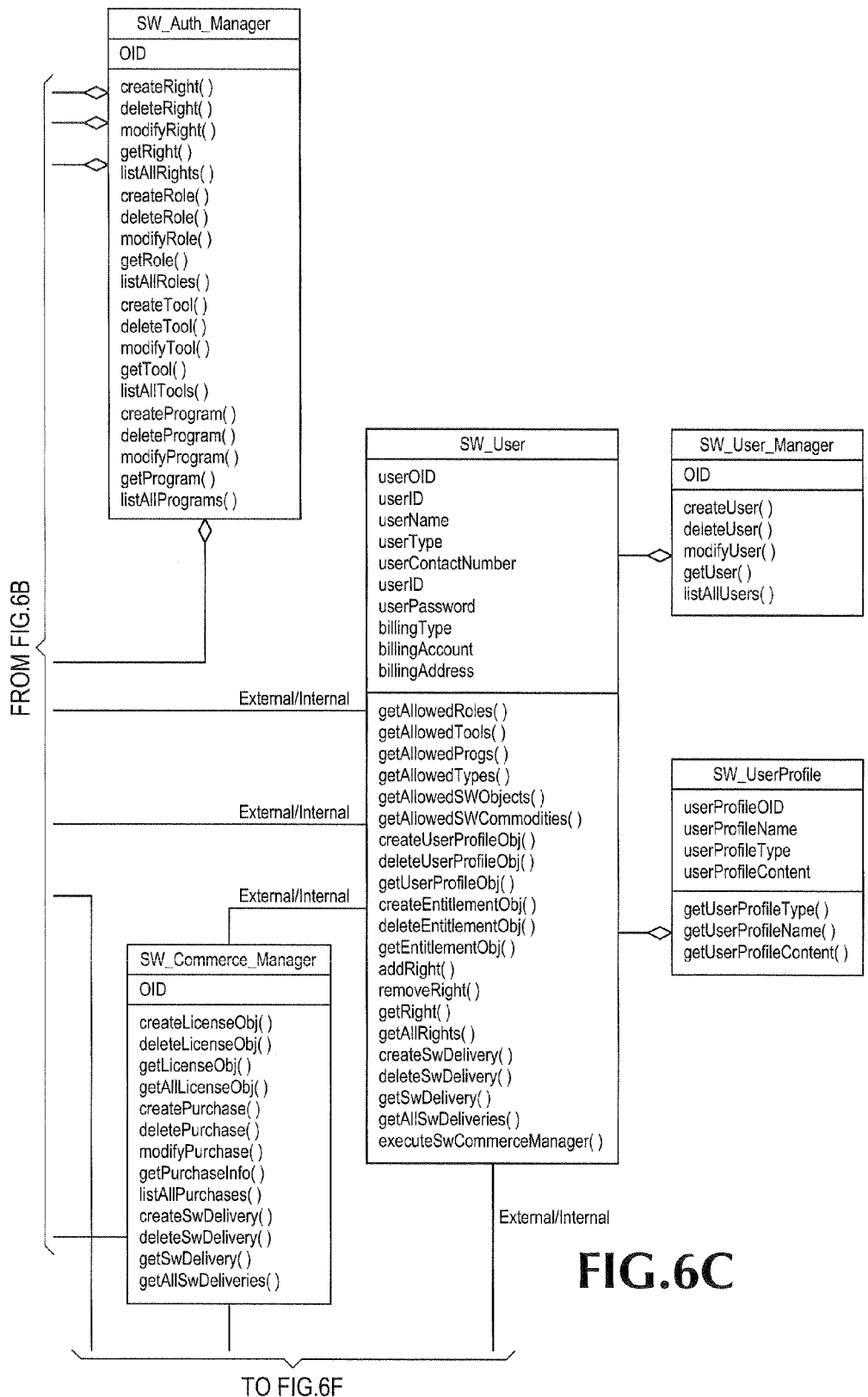
Figure 6D:
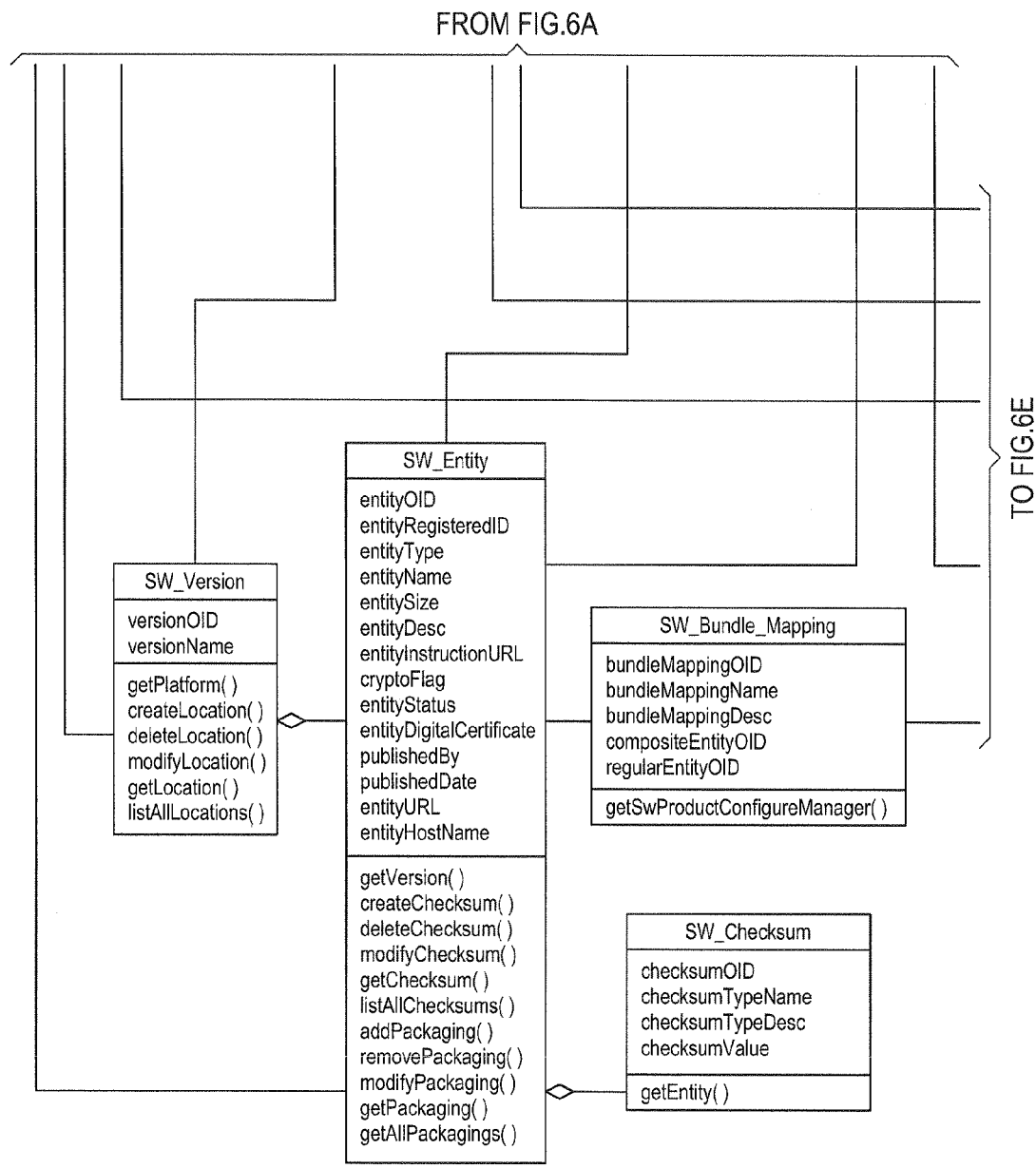
Figure 6E:
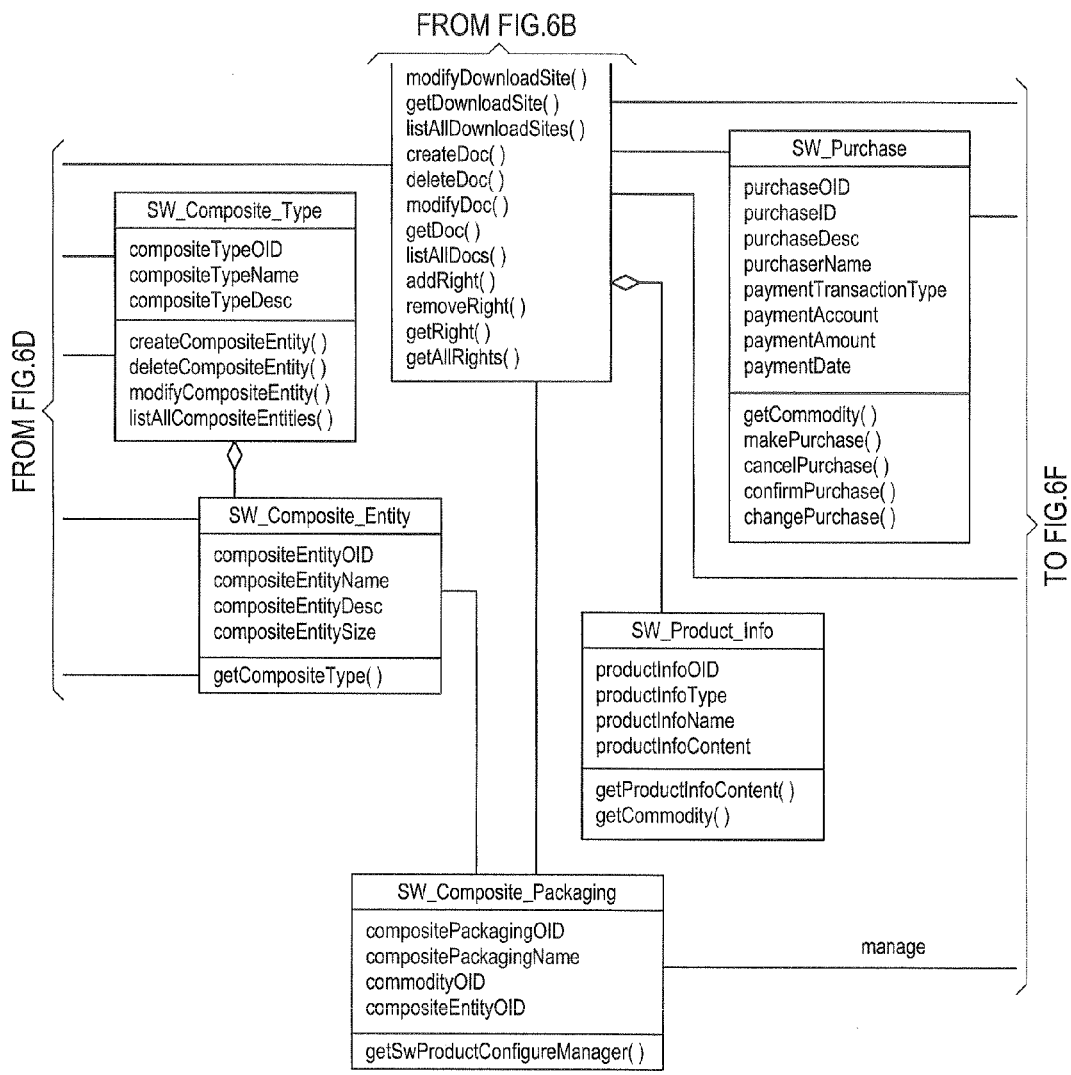
Figure 6F:
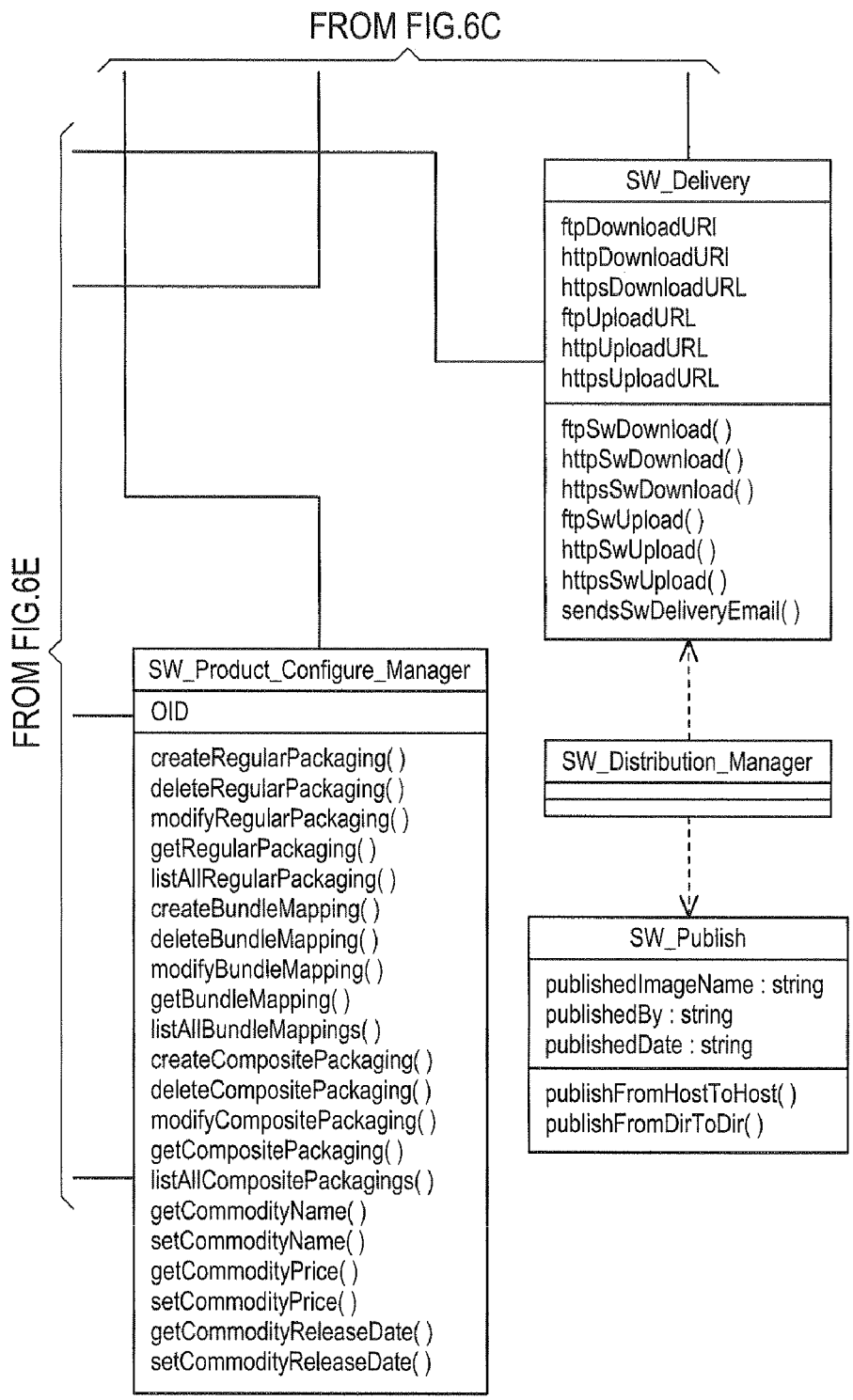

The present invention comprises a comprehensive object oriented software architecture (e.g., via a Cisco XML-Based environment) that is flexibly adaptable (e.g., extensible, scaleable, etc.) to accommodate numerous features. FIGS. 5A-5B are block diagrams of object-oriented software distribution framework (SWDF) architecture 500, one embodiment of the present invention. This software distribution framework is utilized to facilitate automated management of software distribution information and software distribution operations. In one exemplary implementation of the present invention, SWDF architecture 500 objects are tied to a variety of different databases permitting easy and controlled access to large amounts of information associated with numerous software distribution activities. For example, databases associated with activities that are otherwise independent and uncoordinated (such as software development, marketing, purchasing, licensing, delivery, etc.) are conveniently tied together by objects included in (SWDF) architecture 500.

In one embodiment of the present invention, SWDF modules manage the software distribution information and activities in accordance with SWDF models. FIGS. 6A-6F are block diagrams of UML object model 600, one embodiment of the present invention including exemplary indications of classes, attributes and operations. The UML object model 600 stores and organizes tree based extendible information. The objects of UML object model 600 correspond to the objects of object-oriented software distribution framework (SWDF) architecture 500.

In general, object oriented software distribution framework (SWDF) architecture 500 and UML object model 600 comprise the modules that manage different areas of framework information (e.g., user information, authorization information, software information, configuration information, commerce information, publication information, distribution information, etc.). In one embodiment of the present invention, each module comprises a management component and an information component. The information component tracks software distribution framework information. In one embodiment of the present invention, the SWDF information comprises the software characteristics information, software user information and information on the relationships between the software characteristics information and software user information. In one embodiment of the present invention, information objects are linked together by unique object identifiers. The management component functions as a console to facilitate management (e.g., create, update, delete, etc.) of the distribution information component. In one exemplary implementation the present invention is organized in modules that correspond to the different areas of SWDF information.

Figure 7:
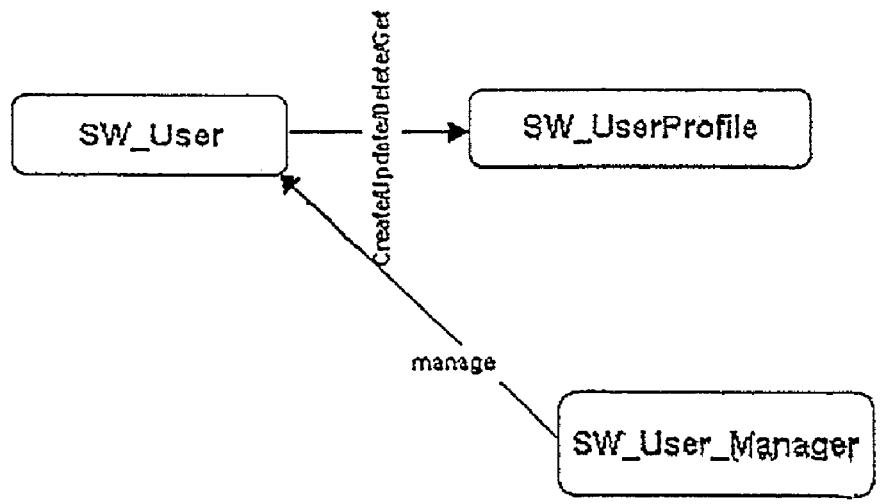
FIG. 7 is a block diagram of a SWDF user management module included in one embodiment of a present invention.

FIG. 7 is an illustration of SWDF user management module 700, one embodiment of a present invention software user management module. The SWDF user management module 700 logically and structurally stores and organizes information that describes the identity and characteristics of a user.

In one embodiment of the present invention, SWDF user management module 700 performs the storing and organization in accordance with a software user model. The software user model includes an entry point object that provides an interface for a user to communicate with SWDF user management module 700. Based upon user input, the user entry point coordinates with a user profile object to store and retrieve user profile information.

In one exemplary implementation of the present invention, SWDF user management module 700 comprises a software user management object (e.g., SW_User_Manager) and a software user information object (e.g., SW_User, SW_UserProfile, etc.). The software user management object (e.g., SW_User_Manager) provides a console to control a software user information object. In one exemplary implementation of the present invention, the software user management object (e.g., SW_User_Manager) is registered in an SWDF internal program object and is utilized to manipulate (e.g., create, delete, modify, get, etc.) a software user information object (e.g., SW_User object).

In one embodiment of the present invention, a software user information object includes a software user object. The a software user object (e.g., SW_User) that provides an interface for a user to communicate with software user management module 700. In one exemplary implementation the software user object is utilized as the entry point for a requester or user to initiate an action (e.g., a software purchase, software access, software licensing modifications, software entitlement checking, etc.). The software user object includes an attribute (e.g., User_Object_ID or UserOID) that is a unique object identifier. The software user object is also utilized to create, delete, modify, and get a user profile object (e.g., SW_UserProfile object).

A user profile object (e.g. SW_UserProfile) is utilized to store and retrieve user profile information. In one exemplary implementation, the user profile object (e.g. SW_UserProfile) defines user characteristics (e.g., user name, user mailing address, user phone number, userfax number, user email address, user company information, user professional occupation, service contract association, entitlement level indication, etc.). In one embodiment of the present invention, the user profile object retrieves the user profile information from variety of data sources (e.g., relational database or LDAP database, etc.). In one exemplary implementation of the present invention, a software user profile object is the integration point of a system based on a mutually agreeable XML DTD message specification (e.g., Extensible Markup Language Document Type Defintion metadata information).

Figure 8:
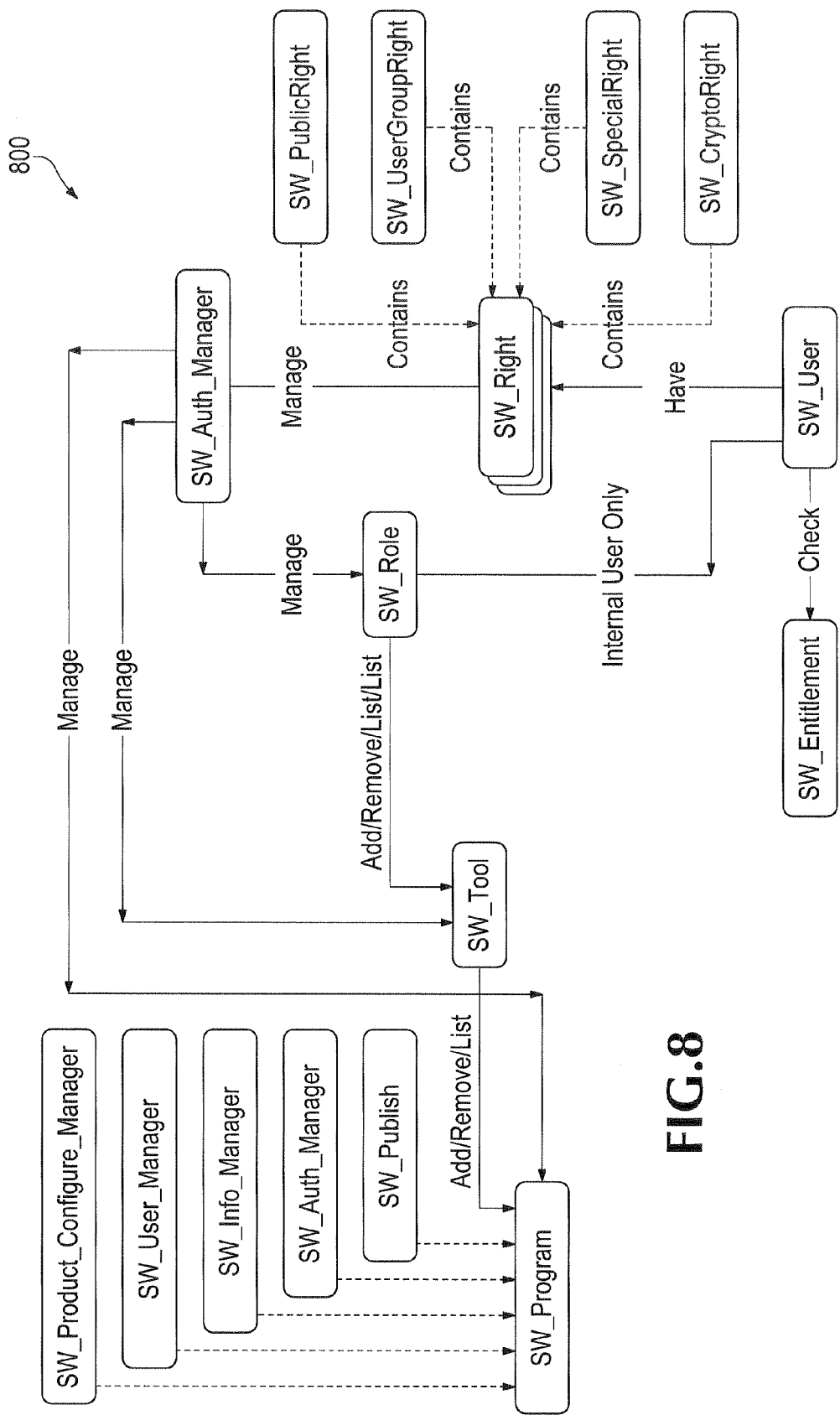
FIG. 8 is a block diagram of an exemplary present invention SWDF authorization module 800.

FIG. 8 is a block diagram of SWDF authorization module 800, one embodiment of a present invention SWDF authorization module. SWDF authorization module 800 is responsible for enforcing an authorization scheme that defines a user's SWDF program and commodity authorizations (e.g., what an individual may or may not do, including read access, write access, download, etc.). In one embodiment of the present invention, SWDF authorization module 800 enforces the authorization scheme in accordance with a software authorization model, software right model and software entitlement model. The software authorization model establishes a hierarchy of authorizations for control and manipulation of SWDF internal software programs. The software right model defines access rights to commodity software programs. The software entitlement model defines distribution entitlements to commodity software products.

In one exemplary implementation of the present invention, SWDF authorization module 800 comprises a software authorization management object (e.g., SW_Auth_Manager) and a software authorization information object (e.g., SW_Role, SW_Tool, SW_Rights, etc.). The software authorization management object (e.g., SW_Auth_Manager) provides a console to control a software authorization information object. In one exemplary implementation of the present invention, software authorization management object (e.g., SW_Auth_Manager) is registered in a SWDF internal object and is utilized to manipulate (e.g., create, delete, modify, get, etc.) a software authorization information object (e.g., SW_Role, SW_Tool, SW_Rights, etc.).

Following the overall present invention SWDF architecture, SWDF authorization module 800 divides the authorization scheme into SWDF internal software activity authorization and product activity authorization. In one embodiment of the present invention, SWDF authorization module 800 includes a software authorization information object utilized for determining authorization to access and manipulate SWDF internal software programs (e.g., programs registered in the SW_Programs object). In one embodiment of the present invention, SWDF authorization module 800 includes a software authorization information object directed to controlling software commodity access and procurement (e.g., software referenced by the SW_Commodities object).

SWDF authorization module 800 includes a software authorization information object utilized for determining authorization to access and manipulate SWDF internal software programs based upon roles in one embodiment of the present invention. An authorization role based object (e.g., SW_Role) includes information indicating a software user's privileges and responsibilities with respect to SWDF software programs. In one exemplary implementation of the present invention, a software role base object (e.g., SW_Role) provides a correlation between authorization activities (e.g., read access, write access, etc.) and a job title (e.g., SWDF Administrator, Content Engineer, Software Engineer, Quality Analysis Engineer, Product Manager, etc.) or vise versa. In one embodiment of the present invention, a role based authorization object (e.g., SW_Role) includes an attribute that is a unique object identifier (e.g., Role_Object_ID or RoleOID).

SWDF authorization module 800 includes a software authorization information object utilized for determining authorization to access and manipulate SWDF internal software programs based upon tools in one embodiment of the present invention. An authorization tool based object (e.g., SW_Tool) provides another abstract control layer in the organization and management of software tools (e.g., SWDF Tools, Quality Analysis Tools, Build Tools, Configure Tools, etc.). The tools are utilized to manipulate software programs (e.g., define permissible manipulations). In one embodiment of the present invention, a software based tool object (e.g., SW_Tool) includes an attribute that is a unique object identifier (e.g., Tool_Object_ID or ToolOID).

A software authorization rights object (e.g., SW_Right) is included in one exemplary implementation of the present invention and is responsible for defining access privileges of a user to a commodity object. The software authorization rights object is created, deleted, and modified by a software authorization management object (e.g., SW_Auth_Manager). A software right object (e.g., SW_Right) includes an attribute that is a unique object identifier (e.g., Right_Object_ID or RightOID). In one exemplary implementation of the present invention, a software right object (e.g., SW_Right)

includes a variety of different categories of software rights (e.g., public rights, group rights, special rights, cryptography rights, etc.).

In one embodiment of the present invention, a software right object (e.g., SW_Right) includes a public rights object. A software public right object (e.g., SW_PublicRight) includes information associating a "public right" to access a commodity. In one exemplary implementation of the present invention, a software public right object (e.g., SW_PublicRight) indicates the existence of free access to download a software image. In one embodiment of the present invention, all requesters that are registered with the present invention system and method as a user are automatically assigned authorization to access and download software designated as public rights software.

A software right object (e.g., SW_Right) includes a group right object in one embodiment of the present invention. A software group rights object (e.g., SW_UserGroupRight) includes information on a group that has rights to access a commodity and provides a requester from a user group access to commodity. In one exemplary implementation of the present invention, the group designations include commerce, guest, customer, partner, employee, and reseller.

A software right object (e.g., SW_Right) includes a special right object. In one embodiment of the present invention. A software special right object (e.g., SW_SpecialRight) includes information on a special right to access a commodity. In one exemplary implementation of the present invention, a special right access is associated with a special channel that delivers particular software (e.g., interim software, beta software, software upgrade) to a special customer from an organization's (e.g., a company's) software center with a special file access mechanism for special software publishing and software distributing. A special file access could be assigned to any customer for software files which are accessible during a specific period defined by an effective date and an expiration date, a purge or delete process is performed after a software right expiration date. In one exemplary implementation of the present invention, an organization's (e.g., a company) software center dynamically creates a special file directory accessible to a special customer for downloading some interim, trial, or special software files.

A software right object includes a crypto right object in one embodiment of the present invention. A crypto software right object (e.g., SW_CryptoRight) includes information on crypto information associated with commodity access. Crypto software rights are related to export restrictions. To assure only the entitled user obtains the crypto software images, new entitlement type and group membership are formed. In one exemplary implementation of the present invention, a crypto software right is responsible for an organization crypto software entitlement type and membership and an organization crypto software right is the most restricted software access privilege related to the organization's export restrictions.

Figure 9:
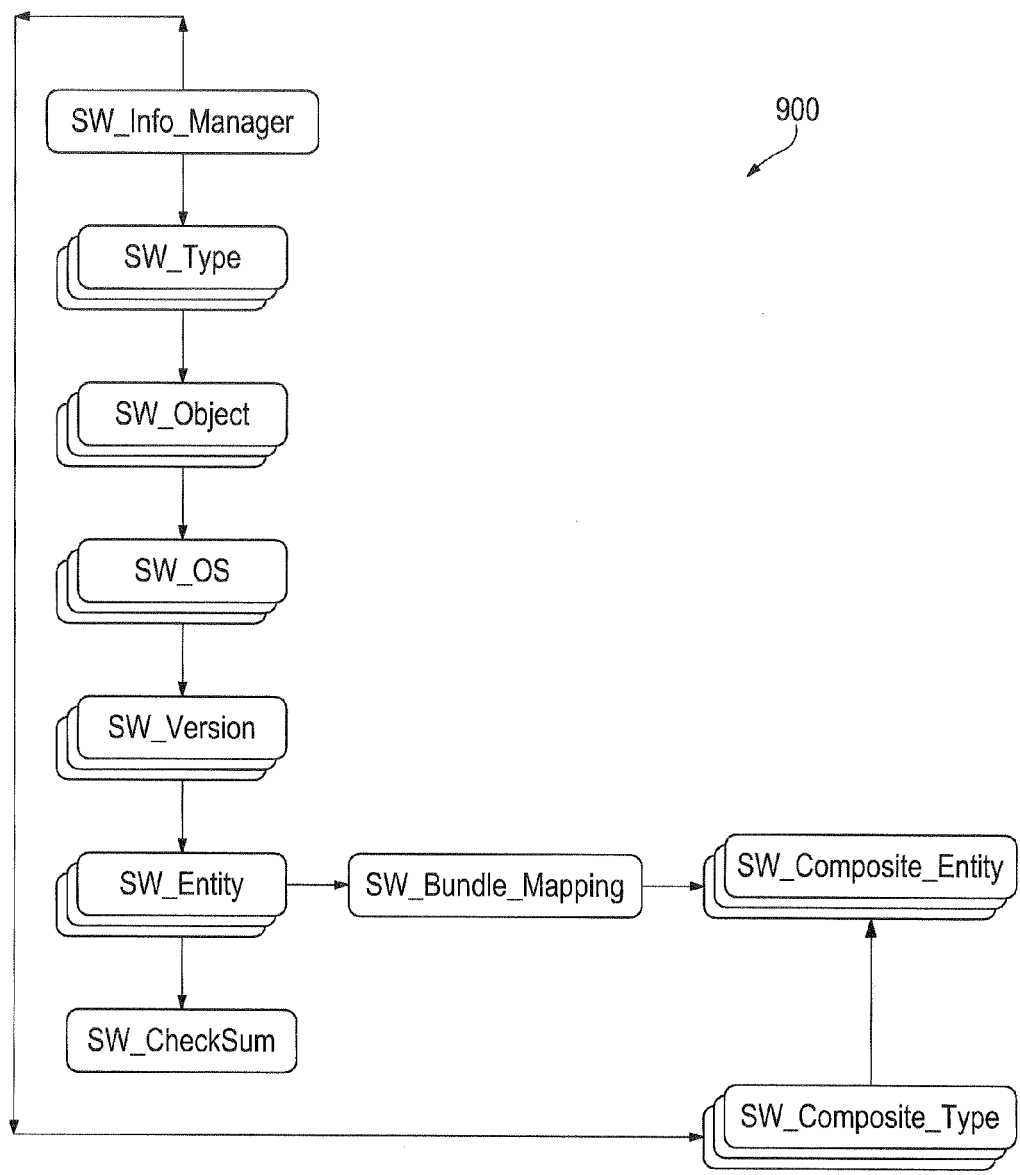
FIG. 9 is a block diagram illustrating one embodiment a of present invention SWDF information management module.

FIG. 9 is a block diagram illustration of SWDF information management module 900, one embodiment of a present invention SWDF information management module. SWDF information management module 900 stores and organizes information that describes the characteristics and features of software tracked by a present invention SWDF architecture. In one embodiment of the present invention, SWDF information management module 900 stores and organizes the information in accordance with a software information model and a software composite information model. The software information model defines an extensible and scaleable data structure for information about the characteristics and features of the software. The software composite information model defines a data structure for composite information on the software.

In one exemplary implementation of the present invention, SWDF information management module 900 comprises a management object (e.g., SW_Info_Manager) and software information objects (e.g., SW_Type, SW_Object, SW_OS, SW_Version, SW_Entity, and SW_Checksum). The software information management object (e.g., SW_Info_Manager) is utilized to manage (e.g., create, update, and delete the software information objects). SWDF information management module 900 is illustrated in an Object-Oriented Software Architecture (implemented by a scaleable tree-based extensible data structure based on the child-parent relationship) for an exemplary embodiment implemented on a Cisco XML-Based Software Distribution Framework. In one exemplary implementation of the present invention, the software information management object (e.g., SW_User_Manager) is registered in a SWDF internal object.

In one embodiment of the present invention, the software information objects include information about the characteristics and features of the software. A software type object (e.g., SW_Type) includes a broad indication (e.g., a category) of common software characteristics or features of software objects (e.g., Web Browser). A software object (e.g. SW_Object) includes more specific information on characteristics or features (e.g., "Netscape Communicator" and "Microsoft Internet Explorer"). A software operating system object (e.g., SW_OS) includes information about an operating system (e.g., Unix, Linux, MS Windows, and other operating systems) on which a program operates. A software version object (e.g., SW_Version) includes information about the program version. A software entity object (e.g., SW_Entity) includes more detailed or specific software information (e.g., software name, size information, brief description, location where it stored, software readme and installation information, software publish information, etc.). In one embodiment of the present invention, a software object (e.g., SW_Object) also has different versions and sub revisions. A software checksum object (e.g., SW_Checksum) includes information to facilitate digital transfer (e.g., from host to host) based on different protocols (e.g., HTTP or FTP) without data corruption (e.g., BSD checksum, Router Checksum, MD5 Checksum, and Core checksum, etc.). In one embodiment of the present invention, each the software information objects includes an attribute that is a unique object identifier.

In one exemplary implementation of the present invention, SWDF information management module 900 also comprises a composite software information objects (e.g., SW_Bundle_Mapping, SW_Composite_Entity, and SW_Composite_Type). A software composite type object (e.g., SW_Composite_Type) records and tracks information associated with a composite type (e.g., a promotion type, premium customer type, etc.). A composite entity object (e.g., SW_Composite_Entity) comprises a bundle of software entities. A bundle mapping object (e.g., SW_Bundle_Mapping) records and tracks information that maps (e.g., a look up table) a plurality of software entities into a bundle. In one exemplary implementation of the present invention, a bundle of software entities is included in a composite entity associated with a composite type such as premium customers provided a special discount in accordance with a promotion.

Figure 10:
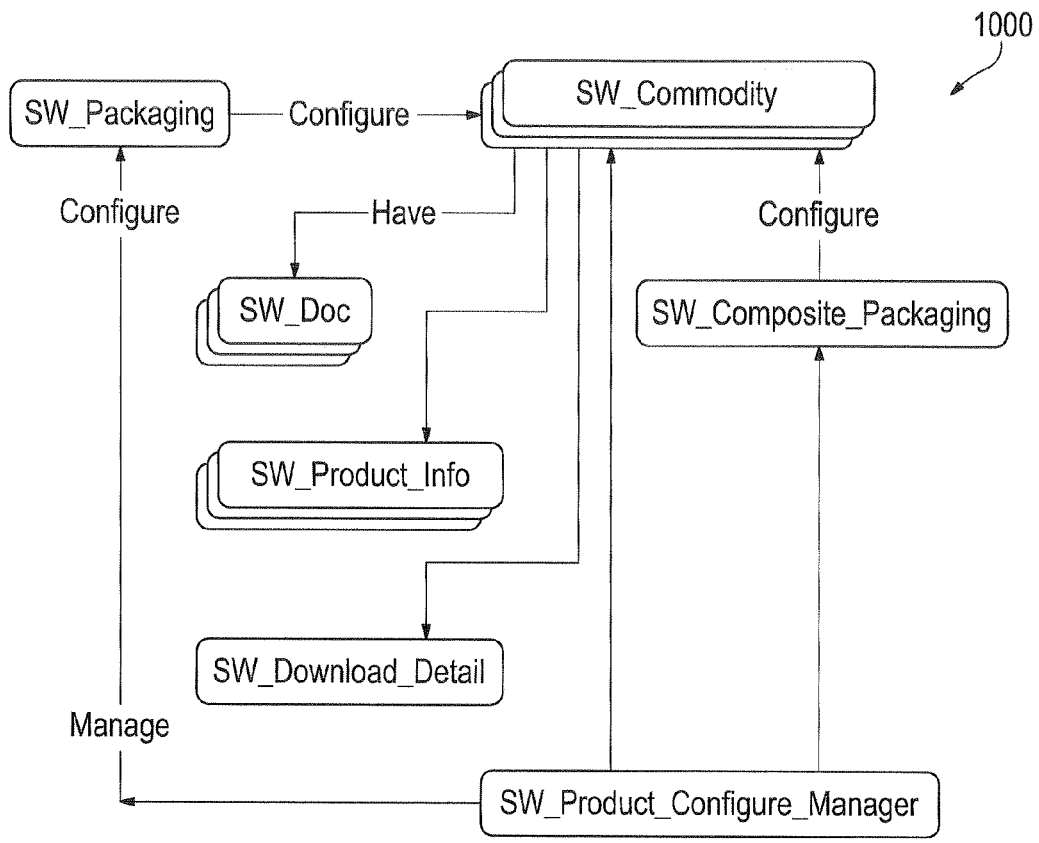
FIG. 10 is a block diagram of SWDF software product configuration module of one exemplary present invention.

FIG. 10 is a block diagram of SWDF software product configuration module 1000, one embodiment of a present invention software product and configuration module. SWDF software product configuration management module 1000 manages and stores information associated with a software product commodity. In one embodiment of the present invention, SWDF software product configuration module 1000 manages and stores product and configuration information in accordance with a software product model, software configuration model and a software release model. The software product model establishes and stores descriptions of the software entities that are included in a commodity for distribution via the present invention SWDF architecture. In one exemplary implementation of the present invention, the software product model also records and tracks locations of additional information associated with a commodity such as locations of software documentation, software product information, and software download details. The software configuration model records and tracks business driven information associated with software packaging (e.g., related to product configuration, software release, software pricing, etc.). The software product release model defines checks on software release procedures.

In one exemplary implementation of the present invention, SWDF software product configuration module 1000 comprises a software product configuration management object (e.g., SW_Product_Configure_Manager) and a software product configuration information object (e.g., SW_Commodity, SW_Doc, and SW_Product_Info, SW_Download_Detail, SW_Packaging, SW_Bundle_Mapping SW_Composite_Packaging, etc.). The software product configuration management object (e.g., SW_Product_Configure_Manager) is utilized to manage (e.g., create, delete, modify, etc.) software product and configuration information objects. In one embodiment of the present invention, the software product configuration management object is utilized as a console to manipulate software information objects.

In one embodiment of the present invention, SWDF software product configuration module 1000 includes a software commodity object (e.g., SW_Commodity). A software commodity object (e.g., SW_Commodity) includes generic software product information (e.g., unique product code information, product name, version, release date, release notes, etc.). In one exemplary implementation, the software commodity object (e.g., SW_Commodity) references a software document object (e.g., SW_Doc), a software product information object (e.g., SW_Product_Info) and a software download detail object (e.g., SW_Download_Details). The software document object (e.g., SW_Doc) includes information on software documentation (e.g., guides, manuals, setup and configuration, etc.) The software product information object (e.g., SW_Product_Info) includes information on product requirements (e.g., memory requirements, disk space, runtime environments, etc.). The software download details object includes down load information (e.g., download site name, site URLs, downloading protocols (e.g., HTTP or FTP), methods (e.g., Secure/Regular etc.), and the number of download times. In one embodiment of the present invention, the software commodity object (e.g., SW_Commodity) includes an attribute that is a unique object identifier (e.g., Commodity_Object_ID or Commodity OID)

In one embodiment of the present invention, SWDF product configuration module 1000 includes a software packaging object and a software composite packaging object. A software packaging object (e.g., SW_Packaging) packages a "software entity" (software binary image) into a commercial software commodity based on software marketing features, software product features and software package requirements, etc. In one exemplary implementation of the present invention a software packaging object (e.g., SW_Packaging) is utilized to represent the mapping of a software image and software product code information. A software composite packaging object (e.g., SW_Composite_Packaging) packages a "software composite entity" (software binary image) into a commercial software commodity. In one embodiment of the present invention, the packaging objects record and track business-driven information associated with software packaging (e.g., related to product configuration, software release, software pricing, etc.).

Figure 11:
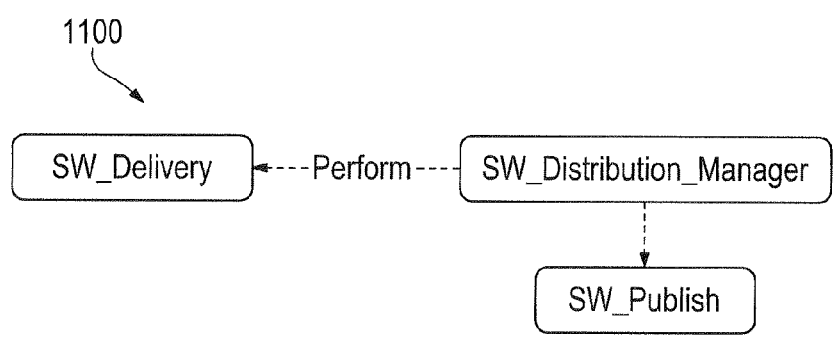
FIG. 11 is a block diagram of one embodiment of a present invention SWDF distribution module.

FIG. 11 is a block diagram of SWDF distribution module 1100, one embodiment of a present invention software distribution module. SWDF distribution module 1100 manages and stores information associated with the publication and delivery of images and commodities. In one embodiment of the present invention, SWDF distribution module 1100 manages and stores distribution information in accordance with a publish model and a delivery model. The software publication model defines and controls publication activities, including recording and tracking locations of software images stored in a software image repository (e.g., a product server, etc.). The software delivery model records, tracks and coordinates with available protocols for the downloading and uploading of software products.

In one exemplary implementation of the present invention, SWDF distribution module 1100 comprises a software distribution management object (e.g., SW_Distribution_Manager) and software distribution information objects (e.g., SW_Publish, SW_Delivery, etc.). The software distribution management object (e.g., SW_Distribution_Manager) is utilized to manage software distribution information objects (e.g., SW_Publish, SW_Delivery, etc.). SWDF distribution module 1100 utilizes a distribution management object as a console to distribution information objects.

In one embodiment of the present invention, SWDF distribution module 1100 includes a software publish object. The software publish object (e.g. SW_Publish) is responsible for the publication of a software image (e.g., by different application groups with different authorization levels to publish on a web site). In one exemplary implementation of the present invention, the software publish object is designed and implemented by an organization (e.g., a company) based on specific business requirements and needs according to HTTP or FTP protocol. SWDF distribution module 1100 is capable of handling separate publishing processes, such as transferring a specific image from one server host to another server host or moving an image from one directory to another directory within the same server host. The SWDF distribution module 1100 is also capable of handling separate delivery processes, such as downloading and uploading software products based on different data communication protocols like HTTP, FTP, etc.

When an image publishing task is performed, the software publish module links with the authorization module (e.g., gets "User Role" information like IOS engineer, SWDF Admin etc.). If permitted by the authorization module, the publish module provides a software image information to be published and an explicit optional publishing destination. The software publishing performs a file transfer (E.g., HTTP or FTP) to a specified destination and the file is published. A publishing exception is shown if the user is not authorized to perform the attempted publishing task. If an unexpected event occurs a software publishing exception is initiated in which the software publishing log information is stored in a SWDF database and a software publishing email alert is sent to related parties.

In one embodiment of the present invention, SWDF distribution module 1100 includes a software delivery object. The software delivery object (e.g. SW_Publish) is responsible for coordinating the delivery of a software image. The software delivery object facilitates uploads and downloads of software products based upon different protocols. In one exemplary implementation of the present invention, downloads are from a SWDF server to a user via different protocols (e.g., FTP, HTTP, HTTPS, SSL, etc.) and uploads are from a user to a SWDF server.

Figure 12:
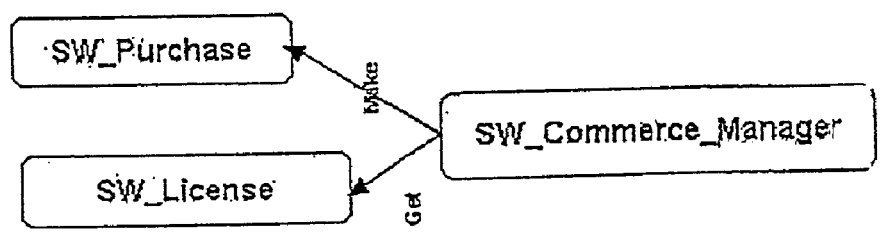
FIG. 12 is a block diagram of SWDF commerce module included in one exemplary implementation of the present invention.

FIG. 12 is a block diagram of SWDF commerce module 1200, one embodiment of a present invention software distribution module. SWDF commerce module 1200 manages and stores information associated commerce activities. In one embodiment of the present invention, SWDF commerce module 1200 manages and stores distribution information in accordance with a software purchase model and a software license model. The purchase model records and tracks purchase information (e.g., purchase agreements) for software The software license model records and tracks license information (e.g., licensing agreements) for software.

In one exemplary implementation of the present invention, SWDF commerce module 1200 comprises a software commerce management object (e.g., SW_Commerce_Manager) and software commerce information objects (e.g., SW_Purchase, SW_License, etc.). The software commerce management object (e.g., SW_Commerce_Manager) is utilized to manage software commerce information objects (e.g., SW_Purchase, SW_License, etc.). SWDF commerce module 1200 utilizes a software commerce management object as a console to commerce information objects.

In one embodiment of the present invention, SWDF commerce module 1200 includes a software purchase object and a software license object. The software purchase object (e.g. SW_Purchase) is responsible for purchases of a software commodity (e.g., through a company commerce web site). In one exemplary implementation, the software purchase object (e.g., SW_Purchase) is designed and implemented based on an organization's (e.g., a company's) specific business specifications. The software license object (e.g. SW_License) records and tracks information associated with software licensing agreements.

In one embodiment of the present invention, the information included in an object oriented software distribution framework (SWDF) architecture is stored in a variety of databases organized under a present invention SWDF database schema. In one exemplary implementation of the present invention, SWDF database schema components are configured in accordance with four categories comprising regular database tables, composite link database tables, associating link database tables and runtime information query components. Regular database tables are persistent storage for the persistent state information of SWDF objects. Link database tables are persistent storage for the relationship of two objects in this framework. If the relationship between two objects in a composite link database table is removed, then the included object is also removed. If the relationship between two objects in the associating link database table is removed the included object continues to exist without the relationship between them. Runtime information query are obtained via a SWDF Application program interface (API) function call during runtime (e.g., software readme information, software publishing log information, software entitlement information, software licensing, software user profile information, etc.

The present invention includes mapping from SWDF architecture objects to a relational database. In one embodiment of the present invention, a SWDF architecture utilizes database tables to map between the SWDF architecture objects and the relational database. FIG. 13A is an illustration of generic SWDF object table 1300, one embodiment of a present invention SWDF object table. Generic SWDF object table 1300 includes four columns comprising an attribute name column, a definition and sample input data column, a not null column, and a data type column. The designation XX in generic SWDF object table 1300 is replaced by an object designation from a SWDF architecture (e.g., a SWDF architecture 500) for a specific database table. For example, a database table to map between the SWDF architecture version object (e.g., SW_Version) and a relational database would have an "Version" designation in place of "XX". The designation YY in generic SWDF object table 1300 is replaced by an object designation from a SWDF architecture (e.g., a SWDF architecture 500) indicating an object that contains "XX". For example, if "XX" refers to the version object (e.g., SW_Version) of a SWDF architecture 500 then the parent object (e.g., SW_OS) contains the version object and "YY" is replaced with "OS".

FIGS. 13B, 13C, 13D, are exemplary SWDF object tables for an operating system object, version object and entity object respectively. FIG. 13D representing an exemplary SWDF software entity table illustrates that generic SWDF object table 1300 can be modified to include additional entries (e.g., rows) for specific implementations. The "child" objects and "parent" objects in these tables means the immediate child object and parent objet respectively. Therefore, the child-parent object relationship designated in these tables really implements tree-based hierarchical data structure for objects of the SWDF architecture making the objects flexible, extensible and scaleable. In one exemplary implementation of the present invention, persistent state information of SWDF objects is stored in a variety of databases (e.g., a relational database).

FIG. 14A is an illustration of generic SWDF link database table 1400, one embodiment of a present invention link database table. Generic SWDF link database table 1400 includes four columns comprising an attribute name column, a definition and sample input data column, a not null column, and a data type column. The designations "AA" and "BB" in generic SWDF link database table 1400 are replaced by linked object designations from a SWDF architecture (e.g., a SWDF architecture 500). For example, if a software program object (e.g., SW_Program) of a SWDF architecture 500 linked to a software type object (e.g., SW_Type) then "AA" is replaced with "Program" and "BB" is replaced with "Type". FIGS. 14B and 14 C are exemplary SWDF link database tables for an program/type link and a user/role link respectively.

Thus, the present invention is a system and method that facilitates streamlining of software distribution management including automated integration of software distribution information. The present invention facilitates efficient and effective management of software distribution information by permitting a flexible combination of various types of information associated with the automated distribution of software. The utilization of a comprehensive object-oriented software distribution framework (SWDF) architecture enables extensible and scaleable implementations to accommodate numerous features and activities associated software distribution. In one embodiment of the present invention, the distribution activities are associated with software development, management, marketing, selling and delivery.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method comprising:
   determining whether a registered user of a software distribution system is authorized to perform internal software development activity corresponding to one or more software projects in the software distribution system, where the internal software development activity includes:
   populating the software distribution system with data associated with downloadable software including at least product release information corresponding to the downloadable software or packaging information that maps the downloadable software to a displayable image corresponding to the downloadable software,
   receiving requisite supervisory authorization to proceed with a publication of the downloadable software, where the requisite supervisory authorization indicates a manager of the software distribution system, other than the registered user, approved the publication of the downloadable software, and
   publishing the downloadable software to the software distribution system according to the data populated in the software distribution system, the publishing performed responsive to receiving the requisite supervisory authorization to proceed with the publication;
   examining commercial transaction rights of the registered user;
   making a determination whether the registered user has entitlement to proceed with a commercial transaction;
   prompting the registered user to provide financial consideration for software to be downloaded or to establish a service contract for the software to be downloaded;
   investigating to determine whether the registered user successfully provided financial consideration for the software to be downloaded or established a service contract for the software to be downloaded; and
   when the registered user is not entitled to proceed with the commercial transaction, executing the commercial transaction when the registered user has provided financial consideration for the software to be downloaded or established a service contract for the software to be downloaded.

2. The method of claim 1 further comprising:
   receiving a request to access the software distribution system, wherein the request is received from an internal user via an internal LAN; and
   determining the request is from the registered user.

3. The method of claim 1 further comprising:
   receiving a request to access the software distribution system, wherein the request is received from an external user via the Internet; and
   determining the request is from the registered user.

4. The method of claim 1 further comprising granting the registered user access one or more software projects stored in an internal storage device.

5. The method of claim 1 further comprising granting the registered user access one or more software projects to download software, make changes to the downloaded software, and upload modified software to the software distribution system.

6. The method of claim 1 wherein a scaleable software distribution system commerce transaction is engaged in an electronic commerce environment.

7. The method of claim 1 wherein a software transaction process is utilized.

8. A method of claim 1 further comprising storing information on commercial transaction rights of the registered users in a software distribution framework (SWDF) system.

9. A method of claim 8 wherein the software distribution framework (SWDF) system stores information on entitlement of external customers to engage in commercial transactions.

10. A method of claim 8 wherein software distribution framework (SWDF) includes information on whether the registered user has established the service contract or provided financial consideration for software to be downloaded and whether the registered user has entitlement to download the software.

11. A method of claim 8 wherein a commercial transaction process is an electronic commerce process.

12. A method of claim 8 wherein the software comprises software image binary executables, readme information,
    installation instructions, product manuals, guide and software requirements, software release note, or software licensing key.

13. An method comprising:
    receiving a request to access a software distribution system determining the request is from a registered user;
    determining whether the registered user is authorized to perform an internal software development activity corresponding to software projects in the software distribution system and determining whether the registered user is authorized to perform a commercial transaction to download software from the software distribution system;
    providing the registered user access to one or more software projects and tools that facilitate the development of the software projects when the registered user is authorized to perform internal software development activity, where the tools create or modify the software projects;
    determining whether the registered user is entitled to perform a commercial transaction to download software from the software distribution system, where the registered user is entitled to perform a commercial transaction with the software distribution system when the registered user has provided financial consideration for the software to be downloaded from the software distribution system or established a service contract corresponding to the software to be downloaded;
    providing the registered user access to software available for distribution that the registered user is entitled to download from the software distribution system, where the registered user downloads the software from the software distribution system when the registered user is both authorized and entitled to perform commercial transactions to download software from the software distribution system;
    storing and tracking information associated with both internal software development activity performed by registered users and commercial transactions resulting in software being downloaded from the software distribution system by registered users;
    confirming the registered user is authorized to publish downloadable software to the software distribution system;
    populating the software distribution system with data corresponding to downloadable software with a software publishing tool available to registered users authorized to perform internal software development activities, the data includes software code, product release information corresponding to the downloadable software, and packaging information that maps the software code to a displayable image corresponding to the downloadable software;

receiving requisite supervisory authorization to proceed with the publication of the downloadable software, where the requisite supervisory authorization includes an accuracy check of the downloadable software by a manager of the software distribution system other than the registered user that populated the software distribution system with data corresponding to downloadable software; and publishing the downloadable software to the software distribution system according to the data populated in the software distribution system, the publishing performed responsive to receiving the requisite supervisory authorization to proceed with the publication.

14. The method of claim 13 wherein the request is received from a software engineer that has built a software image ready for commercial release.

15. The method of claim 13 wherein the data population process includes a software distribution framework (SWDF) Information Model, a SWDF Product Model and a SWDF Packaging Model.

16. The method of claim 13 wherein a software distribution framework (SWDF) packaging model is completed by pulling data from a database that includes features that map a software image and software product code.

17. The method of claim 13 wherein software distribution framework (SWDF) authorization information is checked to make sure the requester has appropriate role responsibility to engage in image publishing.

18. An automated software distribution apparatus comprising:

a bus for communicating information associated with an automated software distribution method;

an input mechanism for receiving requests from a user for access to said information, said user having associated transaction rights;

a computer usable medium to store instructions;

a processor, when executing one or more instructions stored by the computer usable medium, is configured to:

determine whether the registered user is authorized to perform an internal software development activity corresponding to software projects in the software distribution system and determining whether the registered user is authorized to perform a commercial transaction to download software from the software distribution system;

provide the registered user access to one or more software projects and tools that facilitate the development of the software projects when the registered user is authorized to perform internal software development activity, where the tools modify the software projects;

determine whether the registered user is entitled to perform a commercial transaction to download software from the software distribution system, where the registered user is entitled to perform a commercial transaction with the software distribution system when the registered user has provided financial consideration for the software to be downloaded from the software distribution system or established a service contract corresponding to the software to be downloaded;

provide the registered user access to software available for distribution that the registered user is entitled to download from the software distribution system, where the registered user downloads the software from the software distribution system when the registered user is both authorized and entitled to perform commercial transactions to download software from the software distribution system; and a memory for storing and tracking said information associated with an automated software distribution method, wherein said automated software distribution method utilizes a scaleable software distribution framework and object model in which objects are linked together by unique object identifiers;

wherein the processor is further configured to:

confirm the registered user is authorized to publish downloadable software to the software distribution system;

populate the software distribution system with data corresponding to downloadable software with a software publishing tool available to registered users authorized to perform internal software development activities, the data includes software code, product release information corresponding to the downloadable software, and packaging information that maps the software code to a displayable image corresponding to the downloadable software;

receive requisite supervisory authorization to proceed with the publication of the downloadable software, where the requisite supervisory authorization includes an accuracy check of the downloadable software by a manager of the software distribution system other than the registered user that populated the software distribution system with data corresponding to downloadable software; and publish the downloadable software to the software distribution system according to the data populated in the software distribution system, the publishing performed responsive to receiving the requisite supervisory authorization to proceed with the publication.

19. The automated software distribution apparatus of claim 18 wherein the processor is adapted to examine the commercial transaction rights of the registered user;

make a determination if the registered user has entitlement to proceed with a commercial transaction;

when the registered user is not entitled to proceed with the commercial transaction, prompt the registered user to provide financial consideration for the software to be downloaded or to establish a service contract for the software to be downloaded;

investigate to determine if the registered user successfully provided financial consideration for the software to be downloaded or to established a service contract for the software to be downloaded; and execute the requested commercial transaction when the registered user has provided financial consideration for the software to be downloaded or to established a service contract for the software to be downloaded.

20. The automated software distribution apparatus of claim 18 wherein an XML-based software distribution framework is utilized to enable automatic distribution of software over the Internet and World Wide Web (WWW) while coordinating, correlating and collecting information that assists software distribution management and maintenance activities.

21. The automated software distribution apparatus of claim 18 wherein software images are published based on software rights associated with a business rule/responsibility model and software products are distributed to customers based on commerce model.

22. A computer usable medium having a computer readable program code embodied therein for causing a computer system to perform an automated software distribution method, said automated software distribution method comprising:

receiving a request to access a software distribution system;

determining the request is from a registered user;

determining whether the registered user has authorization to perform an internal software development activity corresponding to software projects in the software distribution system and determining whether the registered user is authorized to perform a commercial transaction to download software from the software distribution system;

providing the registered user access to one or more software projects and tools that facilitate the development of the software projects when the registered user is authorized to perform internal software development activity, where the tools create or modify the software projects;

determining whether the registered user is entitled to perform a commercial transaction to download software from the software distribution system, where the registered user is entitled to perform a commercial transaction with the software distribution system when the registered user has provided financial consideration for the software to be downloaded from the software distribution system or established a service contract corresponding to the software to be downloaded;

providing the registered user access to software available for distribution that the registered user is entitled to download from the software distribution system, where the registered user downloads the software from the software distribution system when the registered user is both authorized and entitled to perform commercial transactions to download software from the software distribution system;

utilizing a scaleable software distribution framework and object model in which objects are linked together by unique object identifiers;

confirming the registered user is authorized to publish downloadable software to the software distribution system;

populating the software distribution system with data corresponding to downloadable software with a software publishing tool available to registered users authorized to perform internal software development activities, the data includes software code, product release information corresponding to the downloadable software, and packaging information that maps the software code to a displayable image corresponding to the downloadable software;

receiving requisite supervisory authorization to proceed with the publication of the downloadable software, where the requisite supervisory authorization includes an accuracy check of the downloadable software by a manager of the software distribution system other than the registered user that populated the software distribution system with data corresponding to downloadable software; and publishing the downloadable software to the software distribution system according to the data populated in the software distribution system, the publishing performed responsive to receiving the requisite supervisory authorization to proceed with the publication.

23. The computer usable medium having the computer readable program code embodied therein for causing the computer system to perform the automated software distribution method of claim 22, the automated software distribution method further includes:

examining the commercial transaction rights of the registered user;

making a determination if the registered user has entitlement to proceed with a commercial transaction;

when the registered user is not entitled to proceed with the commercial transaction, prompting the registered user to provide financial consideration for the software to be downloaded or to establish a service contract for the software to be downloaded;

investigating to determine if the registered user successfully provided financial consideration for the software to be downloaded or to established a service contract for the software to be downloaded; and executing the requested commercial transaction when the registered user has provided financial consideration for the software to be downloaded or to established a service contract for the software to be downloaded.

24. The computer usable medium having the computer readable program code embodied therein for causing the computer system to perform the automated software distribution method of claim 23, wherein an internal user is able to download software code, make changes and upload the modified code and both internal and external users are able to engage in a scaleable software distribution system commerce transaction.

* * * * *